US005690858A

United States Patent [19]

Nohira et al.

[11] Patent Number: 5,690,858

[45] Date of Patent: Nov. 25, 1997

[54] MESOMORPHIC COMPOUND, LIQUID CRYSTAL COMPOSITION AND LIQUID CRYSTAL DEVICE

[75] Inventors: Hiroyuki Nohira, Urawa; Michihiro Yamada, Matsuyama; Kazuo Yoshinaga, Machida, all of Japan

[73] Assignee: Canon Kabushiki Kaisha, Tokyo, Japan

[21] Appl. No.: 714,512

[22] Filed: Sep. 16, 1996

Related U.S. Application Data

[63] Continuation of Ser. No. 156,689, Nov. 24, 1993, abandoned.

[30] Foreign Application Priority Data

Nov. 25, 1992 [JP] Japan .................................... 4-336768

[51] Int. Cl.[6] .................................................... C09K 19/52

[52] U.S. Cl. ................................ 252/299.01; 252/299.61; 252/299.62; 252/299.64; 252/299.65; 252/299.66; 428/1; 528/25; 528/26; 528/27; 528/28; 528/31; 528/33; 556/450; 556/454

[58] Field of Search ......................... 252/299.01, 299.61, 252/299.62, 299.64, 299.65, 299.66; 556/450, 454; 528/25, 26, 27, 28, 31, 33; 428/1

[56] References Cited

U.S. PATENT DOCUMENTS

| | | | |
|---|---|---|---|
| 4,367,924 | 1/1983 | Clark et al. | 350/334 |
| 4,561,726 | 12/1985 | Goody et al. | 350/341 |
| 4,820,026 | 4/1989 | Okada et al. | 350/341 |
| 4,883,344 | 11/1989 | Okada et al. | 350/339 R |
| 4,995,705 | 2/1991 | Yoshinaga et al. | 350/350 S |
| 5,129,727 | 7/1992 | Hanyu et al. | 359/75 |
| 5,138,010 | 8/1992 | Keller et al. | 528/26 |
| 5,192,596 | 3/1993 | Hanyu et al. | 428/1 |
| 5,268,780 | 12/1993 | Hanyu et al. | 359/75 |
| 5,451,339 | 9/1995 | Suzuki et al. | 252/299.01 |

FOREIGN PATENT DOCUMENTS

| | | |
|---|---|---|
| 0322703 | 7/1989 | European Pat. Off. . |
| 0344779 | 12/1989 | European Pat. Off. . |
| 0412485 | 2/1991 | European Pat. Off. . |
| 0571276 | 11/1993 | European Pat. Off. . |
| 4300435 | 7/1993 | Germany . |
| 72784 | 4/1988 | Japan . |
| 99204 | 4/1988 | Japan . |
| 161005 | 7/1988 | Japan . |

OTHER PUBLICATIONS

Schadt et al., App. Phys. Lett., vol. 18, No. 4 (1971) 127–8.

Shibaev et al., Polymer Comm., vol. 24, No. 12 (1983) 364–5.

*Primary Examiner*—Shean C. Wu

*Attorney, Agent, or Firm*—Fitzpatrick, Cella, Harper & Scinto

[57] ABSTRACT

A mesomorphic compound represented by the following formula (I):

$$R_1-\underset{CH_3}{\overset{CH_3}{Si}}-O\!\left(\!(\underset{CH_3}{\overset{CH_3}{Si}}O)_n\!-\!(\underset{R_2}{\overset{CH_3}{Si}}O)_m\!\right)_L\!\underset{CH_3}{\overset{CH_3}{Si}}-R_3, \quad (I)$$

wherein $R_1$, $R_2$ and $R_3$ independently denote methyl group or a mesomorphic residual group, at least one of $R_1$, $R_2$ and $R_3$ being a mesomorphic residual group having an optically active group of the formula below as a terminal flexible group:

$$-\overset{CF_3}{\underset{*}{C}H}-R_4$$

wherein $R_4$ is an alkyl group having 1–12 carbon atoms; n is an integer of 0–10; m is an integer of 1–10; and L is an integer of 1–100. The mesomorphic compound is usable for constituting a liquid crystal composition and a liquid crystal device having a large picture area and capable of showing an improved switching characteristic and a good impact resistance.

18 Claims, 1 Drawing Sheet

MESOMORPHIC COMPOUND, LIQUID CRYSTAL COMPOSITION AND LIQUID CRYSTAL DEVICE

This application is a continuation of application Ser. No. 08/156,689, filed Nov. 24, 1993, now abandoned.

FIELD OF THE INVENTION AND RELATED ART

The present invention relates to a mesomorphic compound, a liquid crystal composition containing the mesomorphic compound and a liquid crystal device using them; and particularly to a functional material suitable for constituting, e.g., an optical device utilizing spontaneous polarization in chiral smectic phase.

There has been a well known type of liquid crystal devices using TN (twisted nematic) type liquid crystals as shown, for example, in "Voltage-Dependent Optical Activity of a Twisted Nematic Liquid Crystal" by M. Schadt and W. Helfrich, Applied Physics Letters, Vol. 18, No. 4 (Feb. 15, 1971), pp. 127–128. In this type of liquid crystal devices, the number of picture elements have been restricted, because there is a problem that a crosstalk phenomenon occurs when a device of a matrix electrode structure with a high density of picture elements is driven according to a multiplexing driving scheme. Further, their uses for display have been limited because of slow electric field response and poor visual angle characteristics.

As another type of liquid crystal device, there has been known one comprising a plurality of picture elements each connected to and subject to switching by a thin film transistor as a switching element. This type of liquid crystal device, however, is accompanied with problems such that production of thin film transistors on a substrate is very complicated, and production of a display device with a large picture area or screen is difficult.

In order to obviate the above-mentioned drawbacks of the conventional types of liquid crystal devices, Clark and Lagerwall have proposed the use of a liquid crystal device showing a histability (e.g., U.S. Pat. No. 4,367,924). As the bistable liquid crystal, a ferroelectric crystal showing a chiral smectic C phase (SmC*) of H phase (SmH*) is generally used.

Such a ferroelectric liquid crystal has very rapid response speed on account of having spontaneous polarization, can also exhibit memorizable bistable state and further have excellent vision angle characteristic, and therefore it is considered to be suitable for a display of large capacity and large picture area. In actual production of a liquid crystal cell, however, it is difficult to develop a monodomain over a wide area, thus providing a technical problem in producing a display device of a large area.

In order to produce a display device of a large area easily, it is considered suitable to use a polymeric or polymer liquid crystal. As an example of a liquid crystal display system using a polymeric liquid crystal, it is possible to raise a polymeric liquid crystal display device of a thermal writing-type as disclosed in Polymer Communications, Vol. 24, p.p. 364–365, "Thermotropic Liquid Crystalline Polymers 14" by V. Shibaev, S. Kostromin, N. Plate, S. Ivanov, V. Vestrov and I. Yakovlev.

The above-described system, however, involves several problems such as poor contrast because of the use of light scattering for readout and a delay in response accompanying the use of a polymeric liquid crystal, so that it has not been put to practical use.

Further, Japanese Laid-Open Patent Application (JP-A Kokai) Nos. 72784/1988, 99204/1988, 161005/1988, etc., disclose ferroelectric polymer liquid crystals.

These polymer liquid crystals, however, have viscosities higher than those of low-molecular weight liquid crystals even when the polymer liquid crystals show nematic phase or ferroelectric chiral smectic phase, thus resulting in a considerably lower responsiveness. Accordingly, these have been tried to blend the polymer liquid crystal with a low-molecular weight compound or a low-molecular weight of liquid crystal as a viscosity depressant (or viscosity reducing agent). The thus prepared polymer liquid crystal composition, however, have encountered problems such that the polymer liquid crystal composition shows poor film-forming properties, thus failing to provide a large display area in many cases and that a good polymer liquid crystal device is not provided because a polymer liquid crystal and a low-molecular component have poor compatibility each other to cause phase separation in some cases.

SUMMARY OF THE INVENTION

A principal object of the present invention is to provide a mesomorphic compound having advantages such as capability of being formed in a large area, a low viscosity and good responsiveness when used as a functional material for, e.g., an optical device, a liquid crystal composition comprising the mesomorphic compound, and a liquid crystal device using them.

According to the present invention, there is provided a mesomorphic compound represented by the following formula (I):

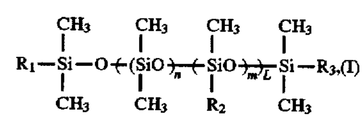

wherein $R_1$, $R_2$ and $R_3$ independently denote methyl group or a mesomorphic residual group, at least one of $R_1$, $R_2$ and $R_3$ being a mesomorphic residual group having an optically active group of the formula below as a terminal flexible group:

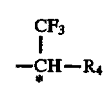

wherein $R_4$ is an alkyl group having 1–12 carbon atoms; n is an integer of 0–10; m is an integer of 1–10; and L is an integer of 1–100.

According to the present invention, there are also provided a liquid crystal composition comprising at least one species of the mesomorphic compound described above and a liquid crystal device comprising a pair of electrode plates and the above mesomorphic compound or the above liquid crystal composition disposed between the electrode plates.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
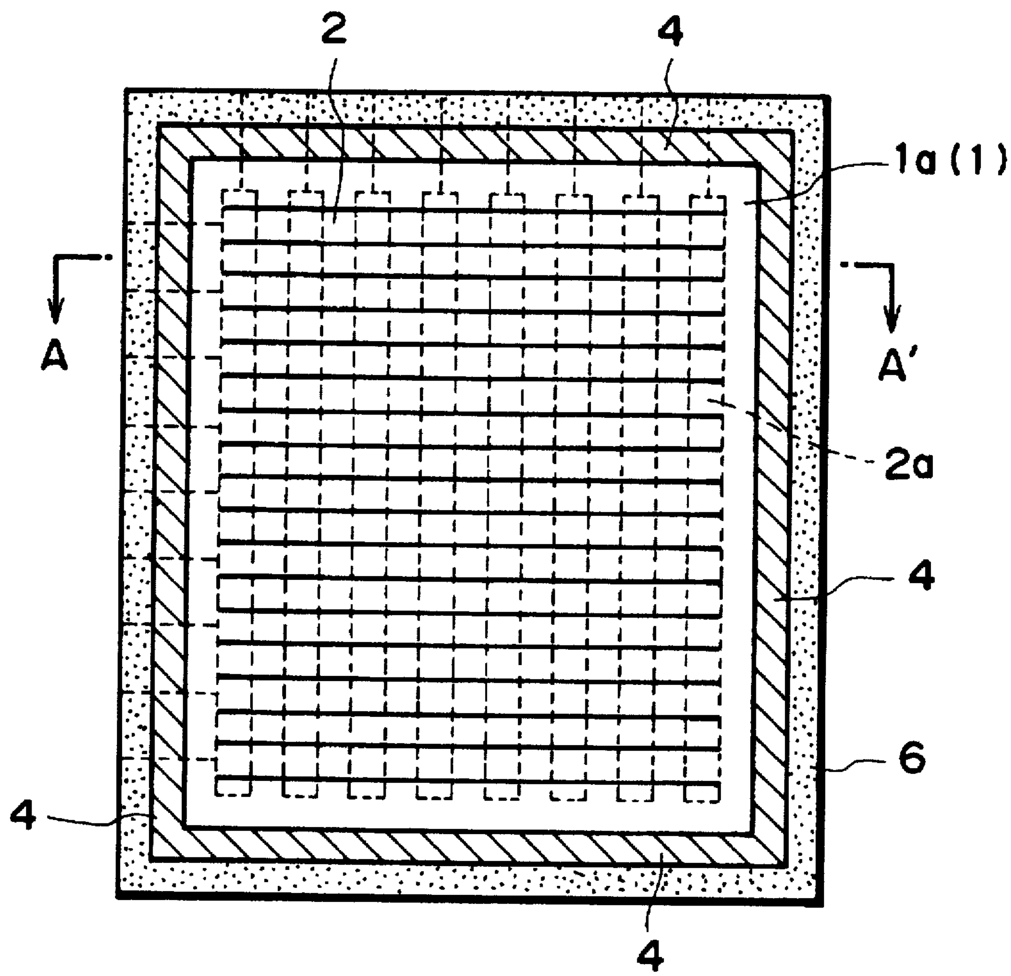
FIG. 1 is a schematic plan view of the liquid crystal device of the present invention.

We have accomplished the present invention by including an optically active trifluoromethyl group in a mesomorphic compound having a siloxane group, whereby there is provided a mesomorphic compound having advantages such as a good impact resistance, a low viscosity and a good responsiveness and also capable of being formed in a large area, and there are also provided a liquid crystal composition comprising the mesomorphic compound and a liquid crystal device using the mesomorphic compound or the liquid crystal composition.

More specifically, in the present invention, the above-mentioned drawbacks of the conventional liquid crystals are remedied by using the mesomorphic compound of the formula (I) described hereinabove.

In a preferred embodiment, the mesomorphic compound of the formula (I) according to the present invention may include:

a mesomorphic compound of the following formula:

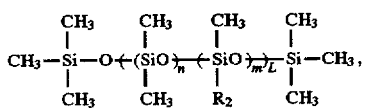

wherein $R_2$, n, m and L have the same meanings as defined in the above-mentioned formula (I); and a mesomorphic compound of the following formula:

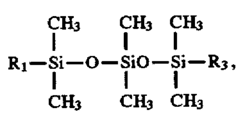

wherein $R_1$ and $R_3$ have the same meanings as defined in the above-mentioned formula (I).

In the formula (I) and the above two formulae, a recurring unit of:

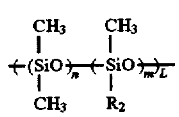

inclusively means cases where $\text{-(}Si(CH_3)_2O\text{)-}$unit and $\text{-(}Si(CH_3)(R_2)O\text{)-}$unit are arranged in this order, in reverse order and in other orders such as alternate order and random order.

The mesomorphic residual group in the formula (I) may be represented by the following formula (II):

$$B\text{-}(Y)_P\text{-}A\text{-}(X)_Q\text{-}C\text{—} \qquad \text{(II)},$$

wherein A is a mesogen group comprising at least two cyclic groups; B is a terminal flexible group; C is a spacer flexible group; and X and Y each is a bonding group selected from the group consisting of —OCO—, —COO—, $—CH_2O—$, $—OCH_2—$ and —O—; and P and Q each is 0 or 1.

Examples of the mesogen group (A) in the above formula (II) may preferably include the following groups but are not restricted thereto.

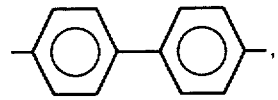

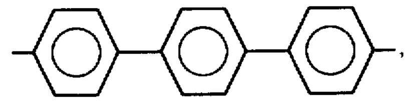

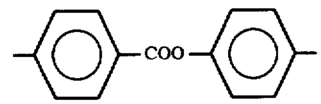

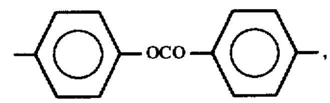

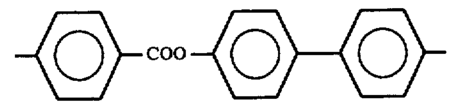

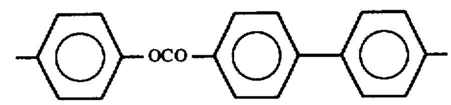

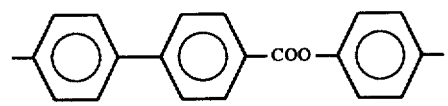

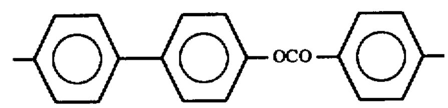

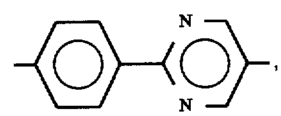

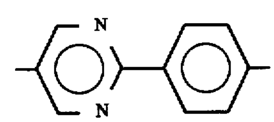

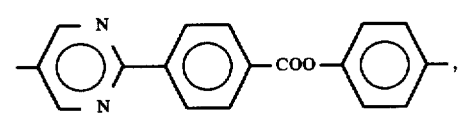

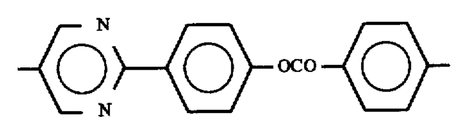

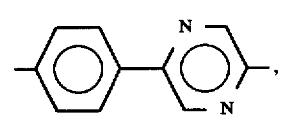

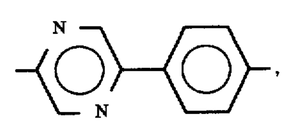

-continued

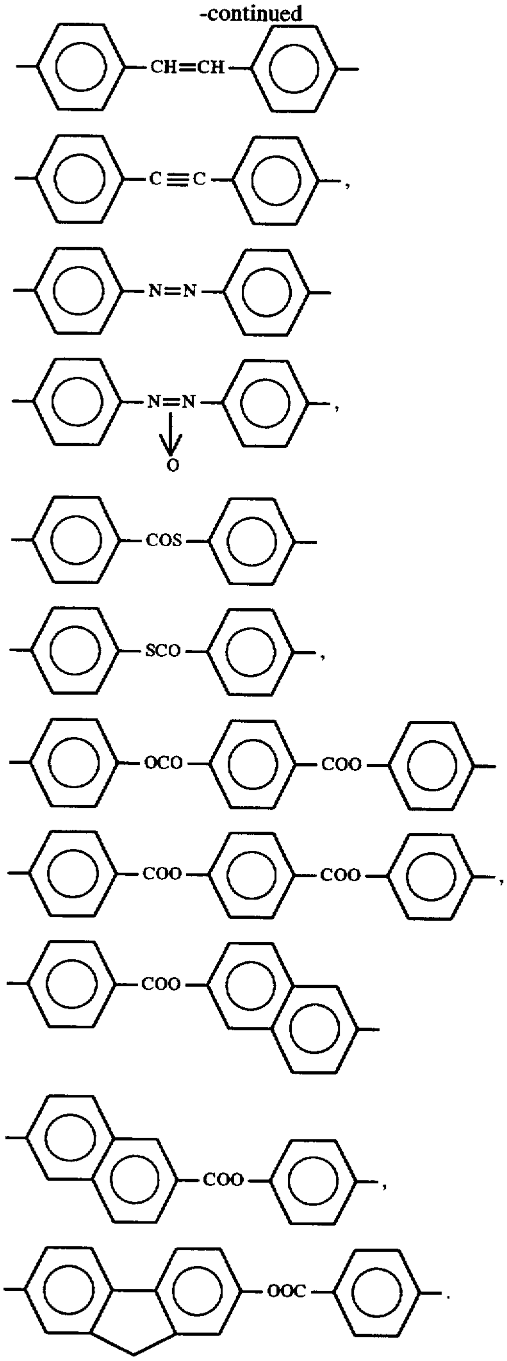

In the present invention, the above-enumerated mesogen groups may be used singly or in combination of two or more species. Further, the mesogen groups may optionally have a substituent such as cyano, halogen, methoxy, trifluoromethyl or methyl, respectively.

Examples of the terminal flexible group (B) in the formula (II) may preferably include a group of:

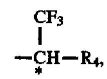

wherein $R_4$ is an alkyl group having 1–12 carbon atoms.

Examples of the spacer flexible group (C) in the formula (II) may preferably be one or two or more groups selected from the following groups:

$-(CH_2)_h-$, wherein h is an integer of 2–16;

$-(CH_2CH_2O)_h-(CH_2CH_2-$, wherein h is an integer of 1–10;

$-(CH_2CH_2CH_2O)_h-(CH_2)_3-$, wherein h is an integer of 1–10; and $-(CH_2CH_2CH_2CH_2O)_h-(CH_2)_4-$, wherein h is an integer of 1–8.

The mesomorphic compound of the formula (I) according to the present invention can generally be synthesized through the steps of: combining a material for a terminal flexible group with a material for a mesogen group, combining a material for a spacer flexible group with the above combined group to form a material for a mesomorphic residual group, and reacting the material for the mesomorphic residual group with a prescribed siloxane compound. In this instance, the material for the mesomorphic residual group is required to have a terminal unsaturated bonding group. The mesomorphic compound of the present invention can be obtained through condensation of the material having the terminal unsaturated bonding group and the siloxane compound by using platinic chloride or chloroplatinic acid.

A mesogen unit in the mesomorphic compound of the formula (I) according to the present invention is mainly constituted by a dimethylsiloxane group, thus being excellent in responsiveness. When such a mesogen unit is contained in the mesomorphic compound of the formula (I) in a larger amount (i.e., a longer mesogen unit of dimethylsiloxane group), the responsiveness is further improved. However, too long mesogen unit adversely affects mesomorphism or mesomorphic properties, thus narrowing a mesomorphic (or liquid crystal) temperature region. Accordingly, n in the formula (I) may preferably 0–10, particularly 1–5 in view of enlargement of SmC* phase and high responsiveness.

Then, representative synthesis schemes of the mesomorphic compound according to the present invention will be explained.

Synthesis of mesomorphic monomer

Two mesomorphic monomers (Compound 2 and 3) were synthesized through reaction schemes A and B by combining optically active 1,1,1-trifluoro-2-octanol (Compound 1) below with a separately prepared liquid crystal core portion (Core), respectively.

(Compound 1)
Scheme A
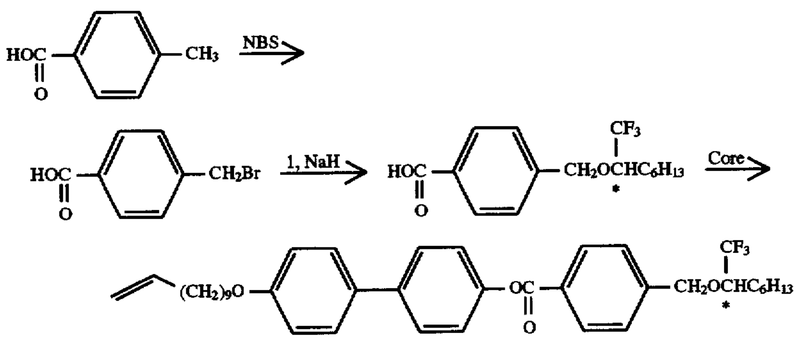
2
(NBS: N-bromosuccinimide)
Scheme B
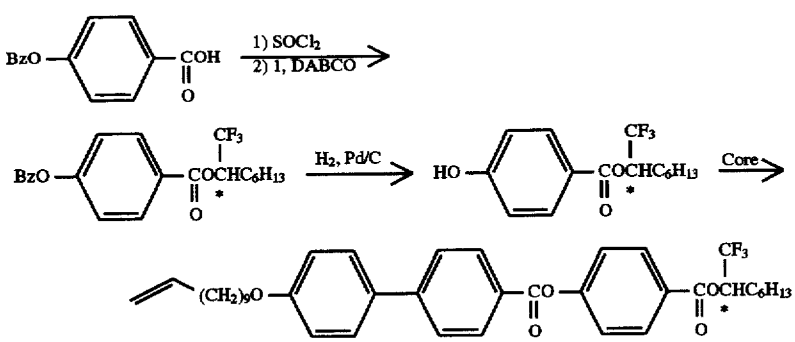
3
(Bz: benzyl)
(DABCO: 1,4-diazabicyclo[2,2,2]octane)
Synthesis of dimer-type mesomorphic compound
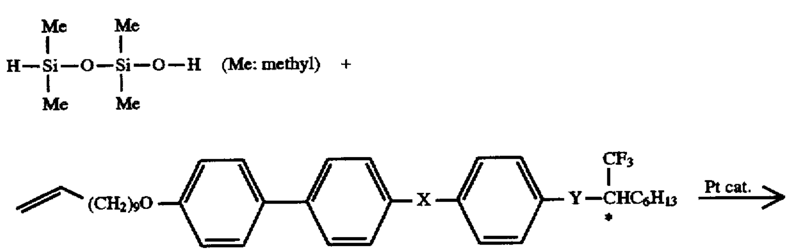
(2 or 3)

-continued

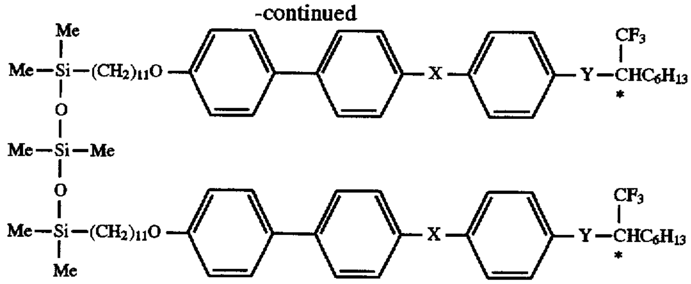

In the above, X is OCO and Y is $CH_2O$ when Compound 2 is used, and X is COO and Y is COO when Compound 3 is used.

Synthesis of polymer-type mesomorphic compound

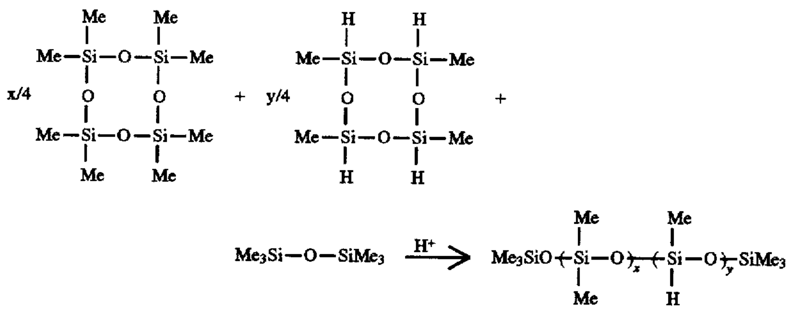

(e.g., x = 16, y = 16)

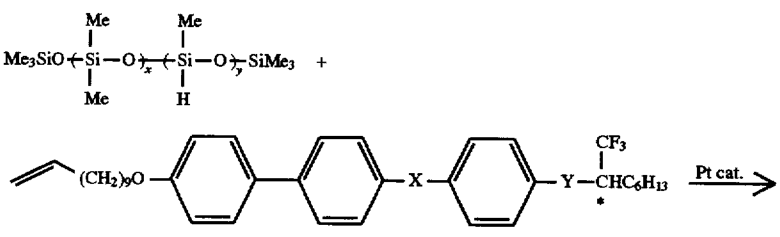

(2 or 3)

In the above, X is OCO and Y is $CH_2O$ when Compound 2 is used, and X is COO and Y is COO when Compound 3 is used.

The thus synthesized polymer-type mesomorphic compound may be purified by performing recrystallization in a mixture solvent system (e.g., tetrahydrofuran (THF)/methanol).

Specific examples of the preferred embodiment of the mesomorphic compound of the formula (I) having the formula:

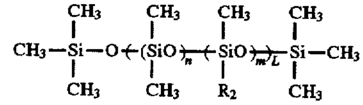

may include those enumerated below.

In the following structural formulae; n is an integer of 0–10, m is an integer of 1–10, L is an integer of 1–100, h is an integer of 2–16, h' is an integer of 1–10, and h" is an integer of 1–8.

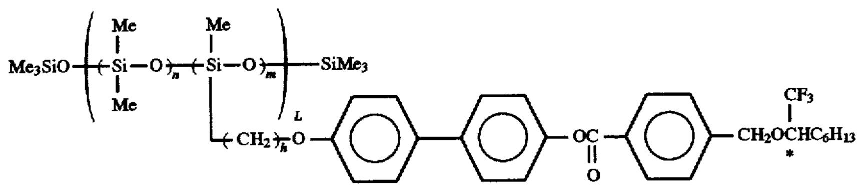
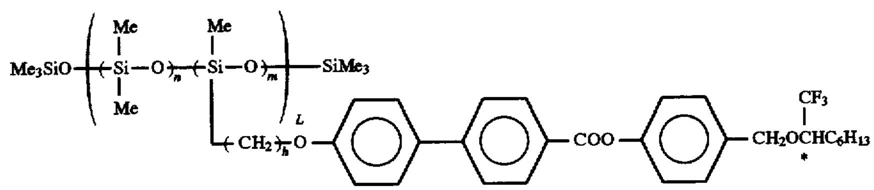
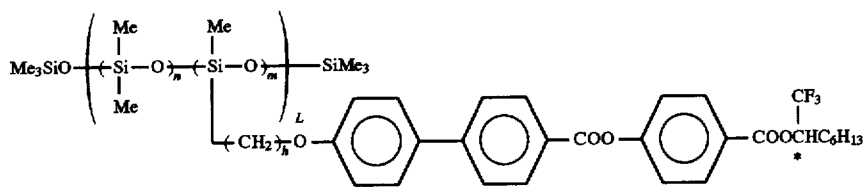
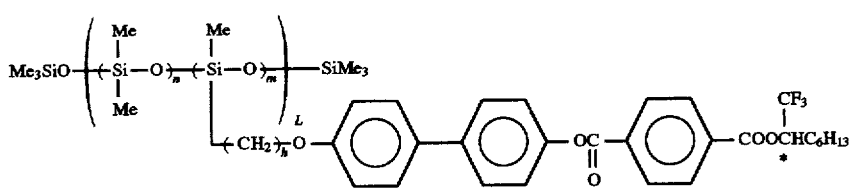
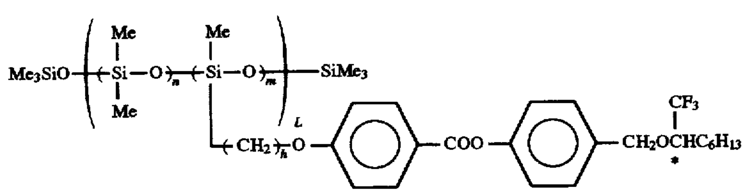
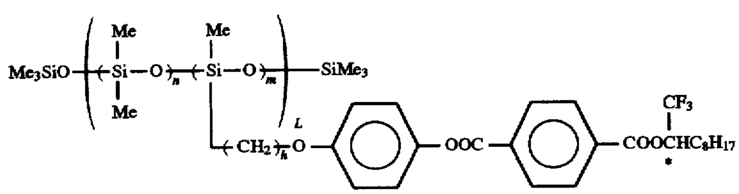
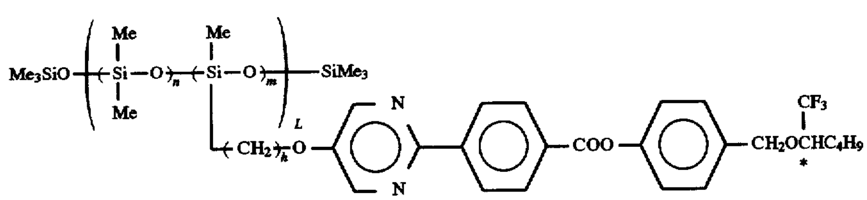
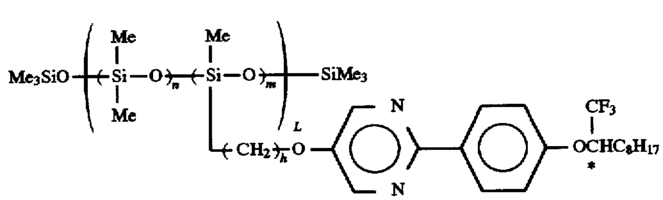

-continued
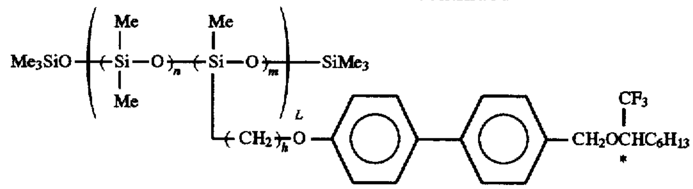
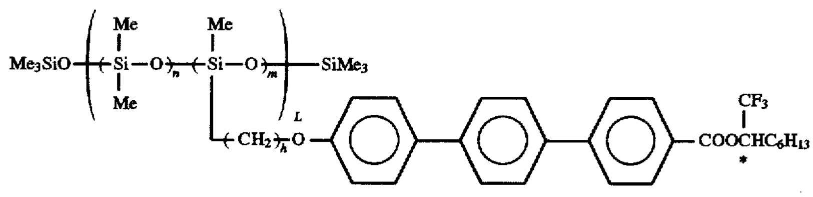
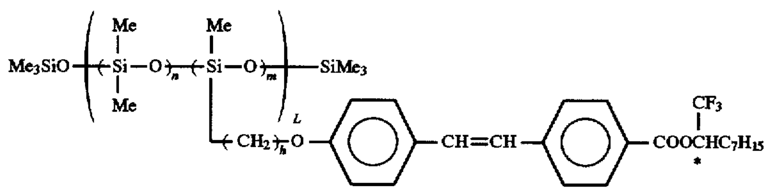
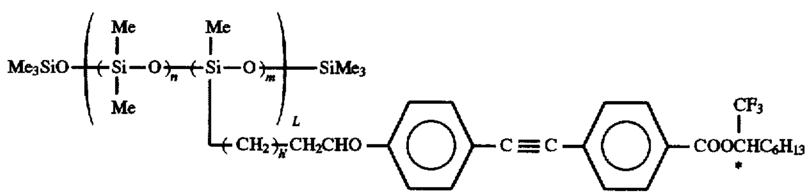
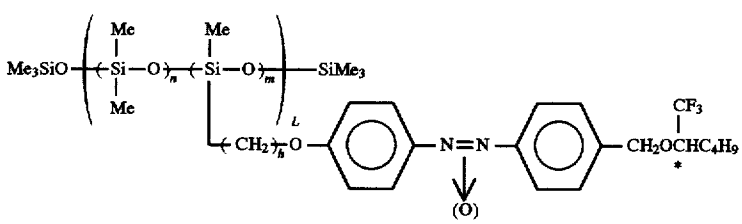
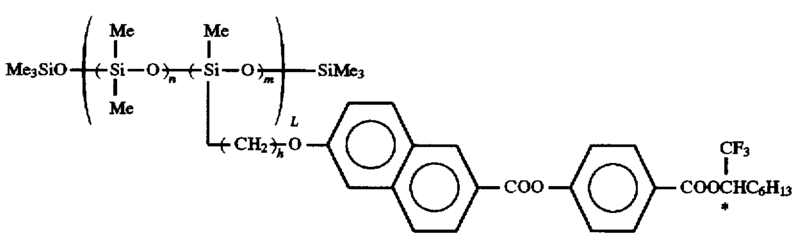
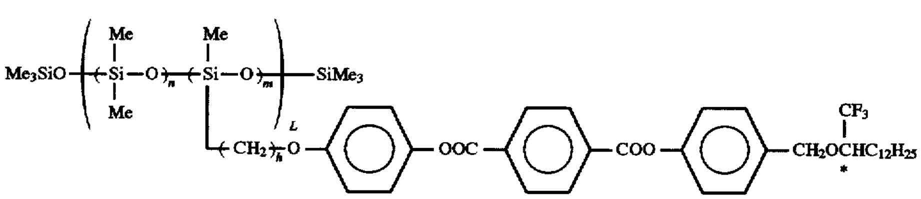
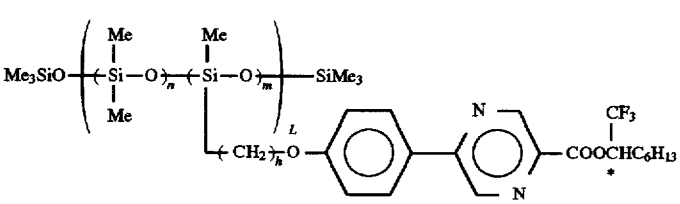

-continued

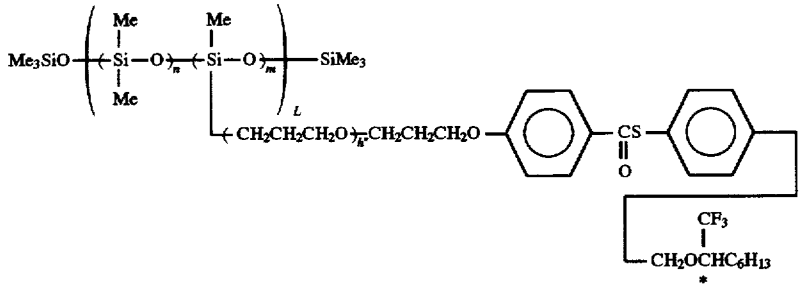

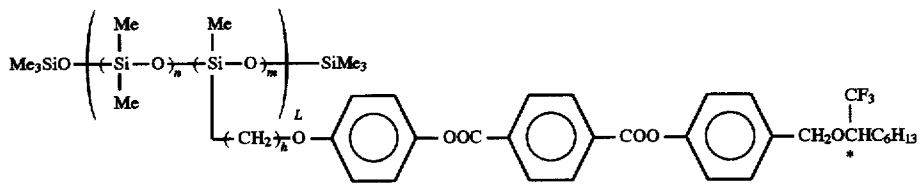

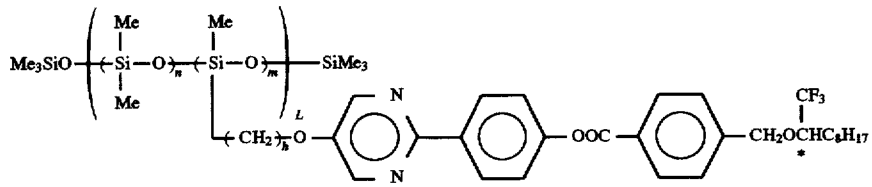

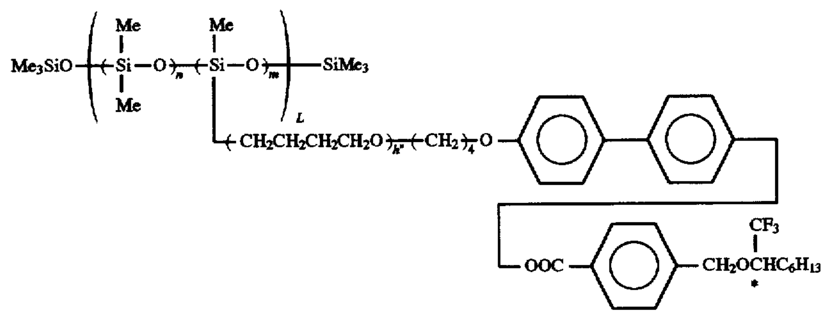

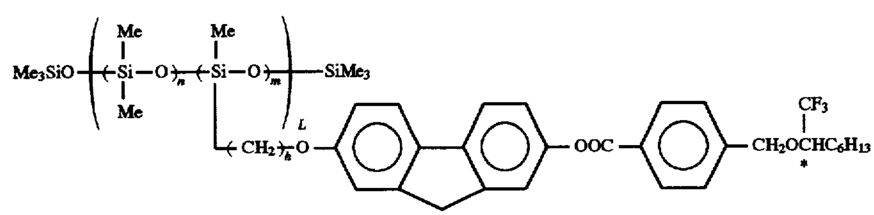

In the polymer-type mesomorphic compound according to the present invention, the mesomorphic compound may optionally contain another mesomorphic residual group which is different from the mesomorphic residual group of the formula (II). Such a mesomorphic compound may generally be obtained through hydrosilylation in which a main chain component such as polyalkylhydrogensiloxane or polyarylhydrogen-siloxane is reacted with a side chain component having a terminal vinyl group by, e.g., graft polymerization.

The polymer-type mesomorphic compound of the formula (I) according to the present invention may preferably have a total content of one or two or more mesomorphic residual groups (including the above-mentioned another mesomorphic residual group) of 1–98 mol. %, more preferably 5–95 mol. %. Below 1 mol. %, an effect of combination becomes insufficient. Above 98 mol. %, properties of the mesomorphic compound of the present invention are impaired.

The polymer-type mesomorphic compound according to the present invention (including one having another mesomorphic residual group) may preferably have a number-average molecular weight (Mn) of 500–1,000,000, more preferably 600–500,000. Below 500, the resultant mesomorphic compound has a poor impact resistance in some cases. Above 1,000,000, a responsiveness to an external electric field becomes worse with an increase in viscosity in some cases.

Specific examples of the above-mentioned another mesomorphic residual group capable of being used in combination with the mesomorphic residual group used in the present invention may include those enumerated below.

In the following structural formulae, m, ml and p each is an integer of 0–30 and * is the location of asymmetric carbon atom. Further, the following specific examples are classified into three groups including:
Nematic: a group liable to afford nematic phase;
Cholesteric: a group liable to afford cholesteric phase; and
Chiral smectic: a group liable to afford chiral smectic phase.
Nematic
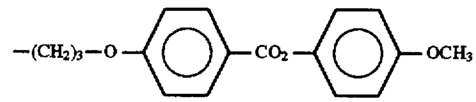
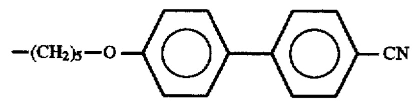
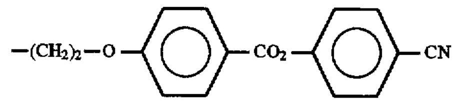
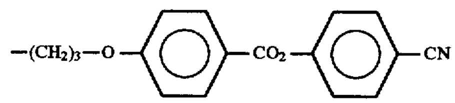
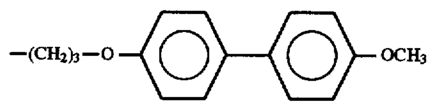
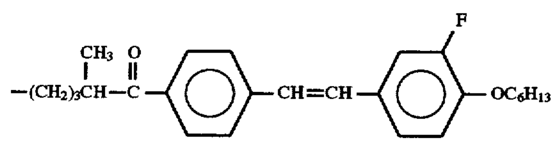
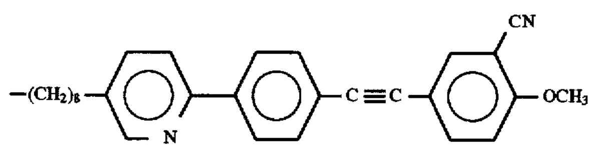
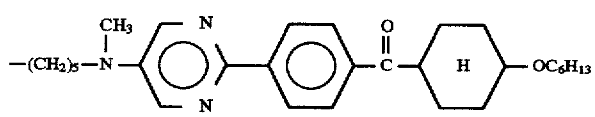
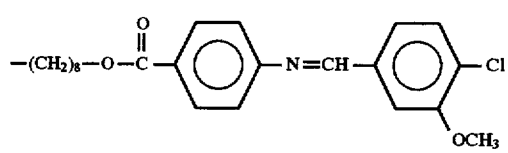
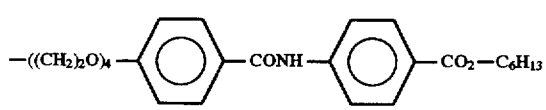
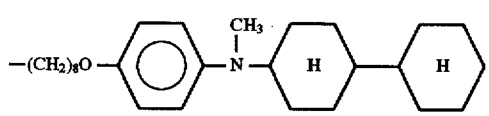
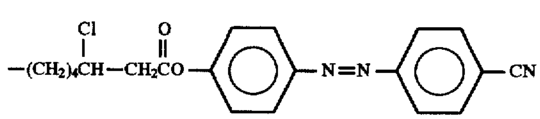

-continued
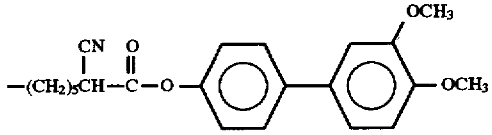
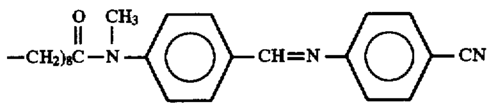
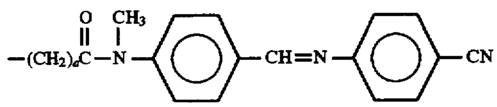
Cholesteric
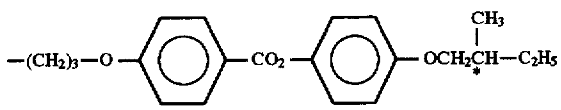
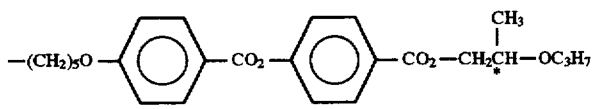
$-(CH_2)_3-O$-(cholesteryl)
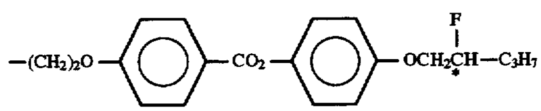
Chiral smectic
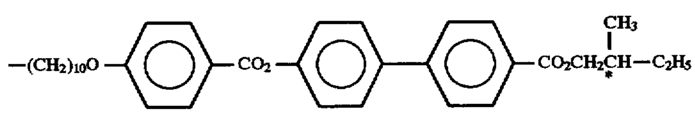
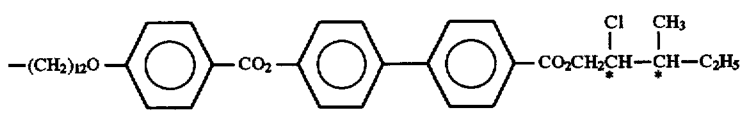
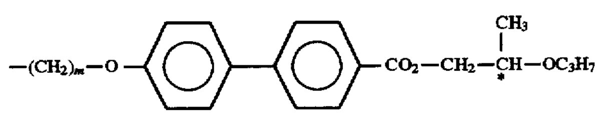
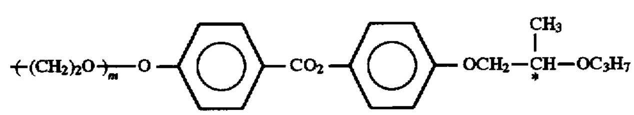
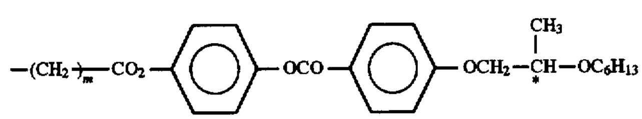
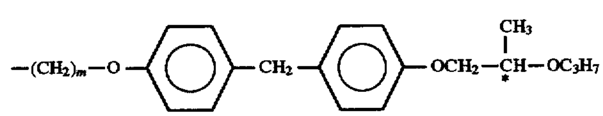
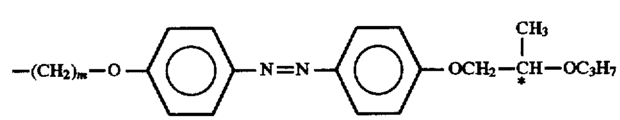

-continued
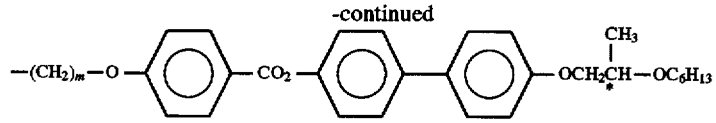
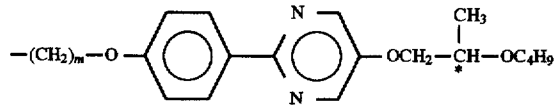
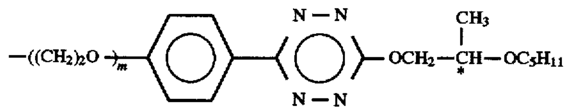
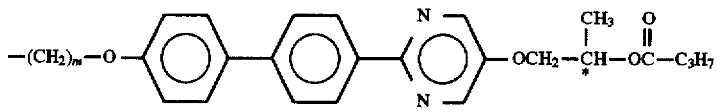
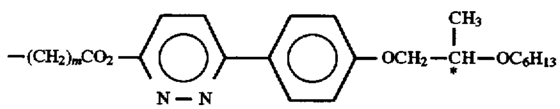
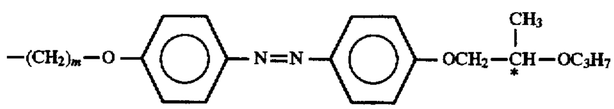
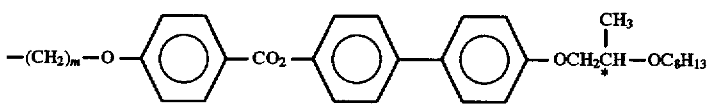
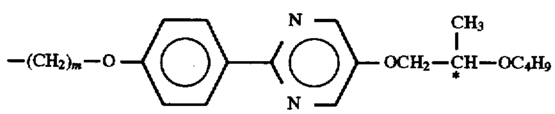
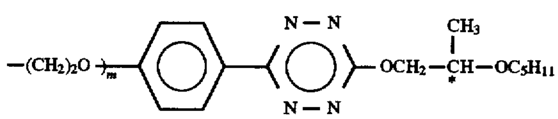
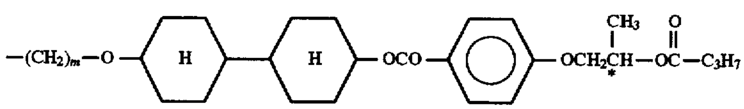
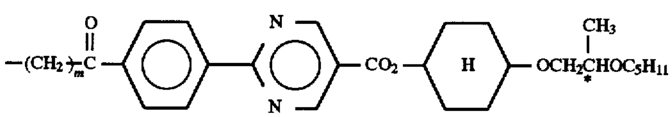
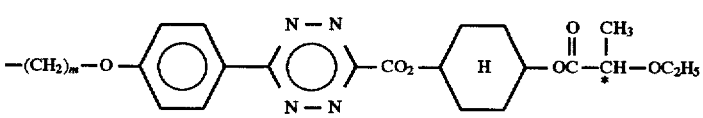
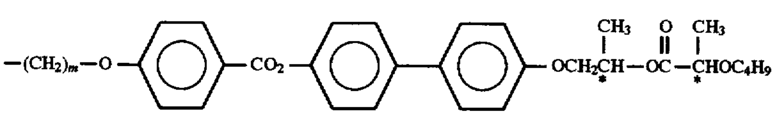
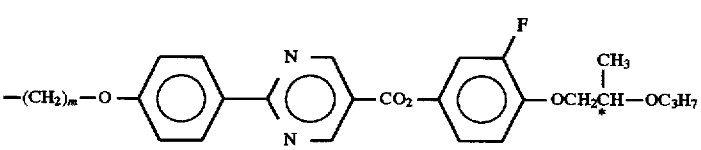

-continued
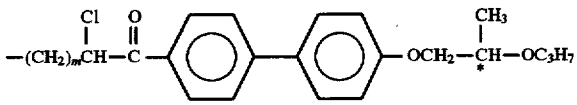
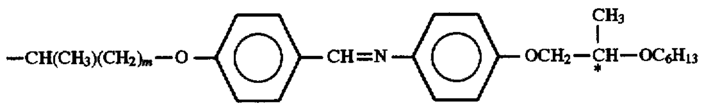
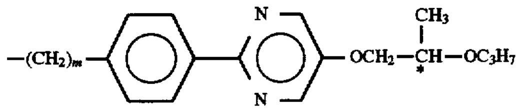
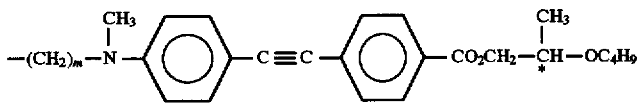
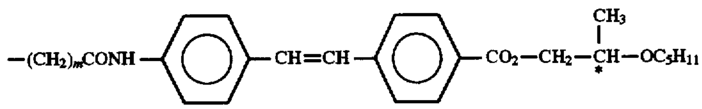
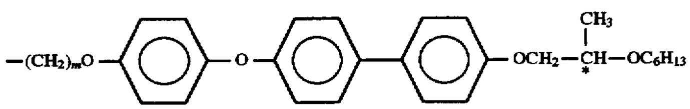
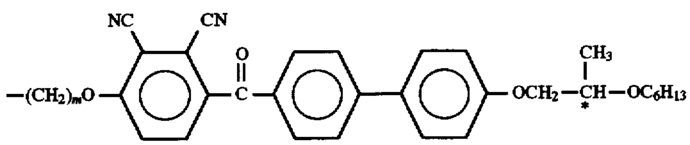
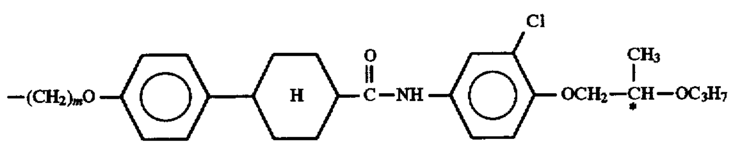
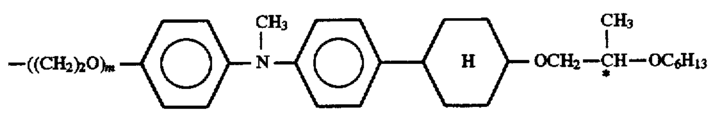
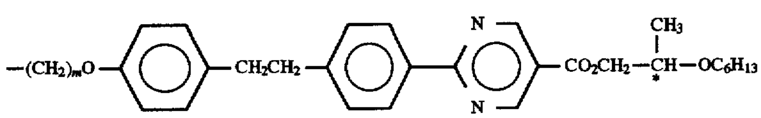
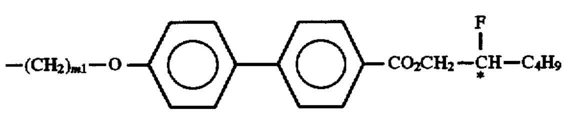
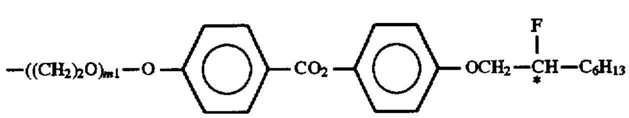
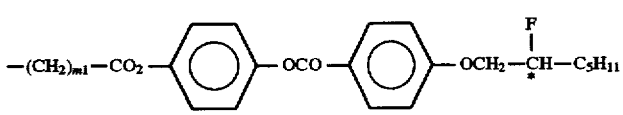
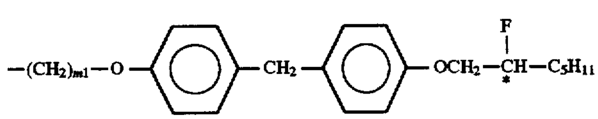

-continued
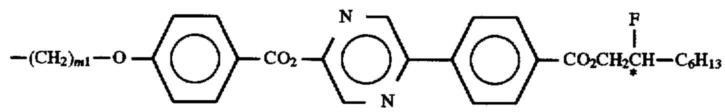
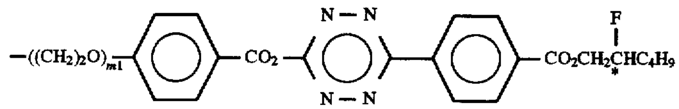
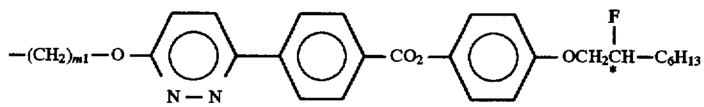
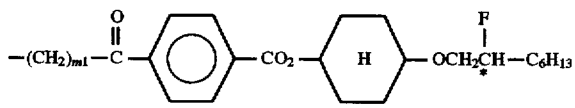
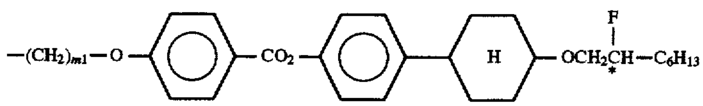
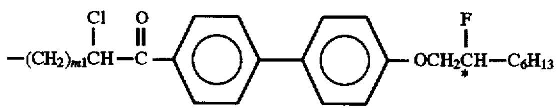
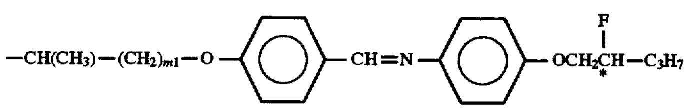
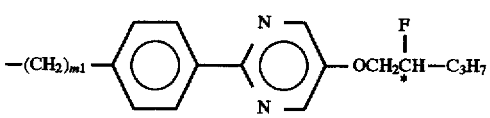
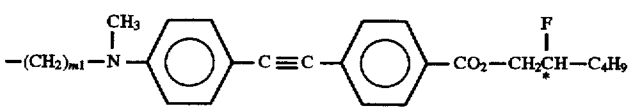
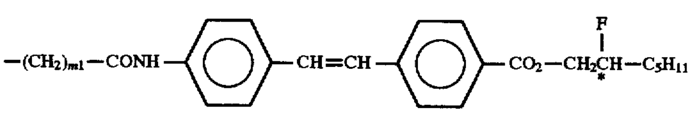
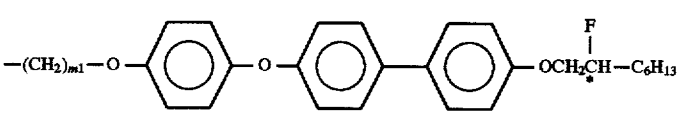
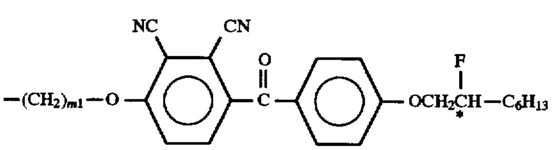
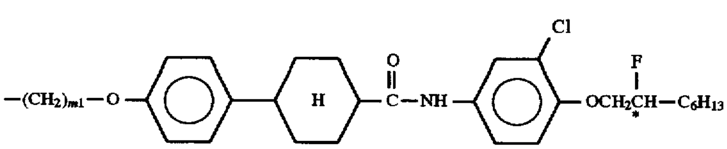

-continued

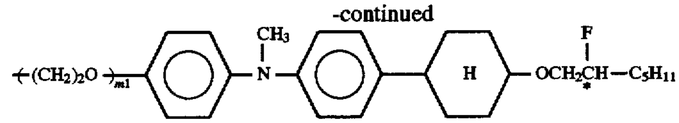

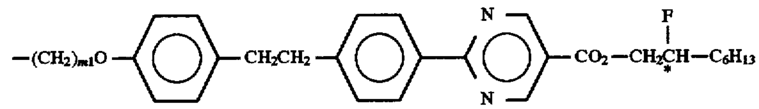

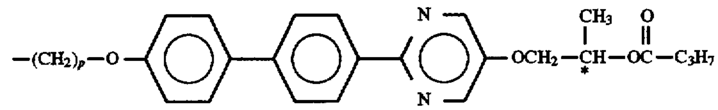

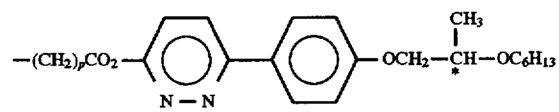

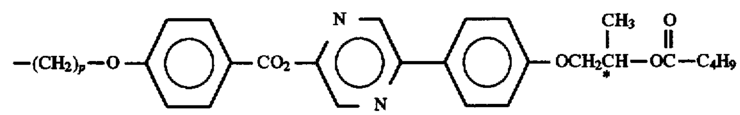

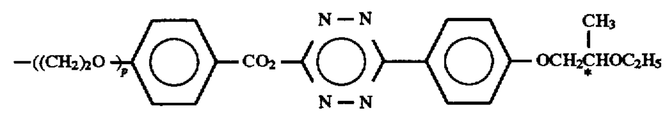

A liquid crystal composition according to the present invention comprises at least one species of the mesomorphic compound of the present invention. More specifically, the liquid crystal composition may be composed of one or two or more species of the mesomorphic compound of the present invention or composed of at least one species of the mesomorphic compound and at least one species of a low-molecular weight (hereinbelow, abbreviated as "low-Mw") mesomorphic compound being optically active or inactive.

In the liquid crystal composition, the mesomorphic compound of the formula (I) is effective in readily enlarging a temperature range of SmC* phase. Further, the liquid crystal composition is free from a decrease in response speed while retaining good performances of high impact resistance, low viscosity, etc.

Specific examples of an optically active low-Mw mesomorphic compound used in the present invention may include those represented by the following structural formulae, which are shown below together with phase transition characteristics.

Herein, the respective symbols denote the following phases:

Cryst.: crystal,

SmC*: chiral smectic C phase,

SmX*: un-identified chiral smectic phase,

SmA: smectic A phase,

SmB: smectic B phase,

SmC: smectic C phase,

SmE: smectic E phase,

SmF: smectic F phase,

SmG: smectic G phase,

SmX: un-identified smectic phase,

Sm3: un-identified smectic phase,

Ch.: cholesteric phase,

N: nematic phase, and

Iso.: isotropic phase.

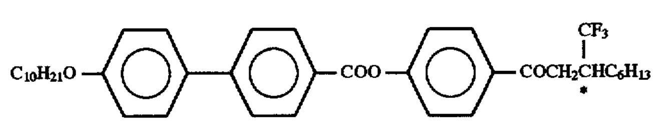

(1)

$$\text{Cryst.} \underset{}{\overset{56^\circ\text{ C.}}{\rightleftharpoons}} \text{Sm3} \overset{98^\circ\text{ C.}}{\rightleftharpoons} \text{SmC*} \overset{132^\circ\text{ C.}}{\rightleftharpoons} \text{SmA} \overset{132^\circ\text{ C.}}{\rightleftharpoons} \text{Iso.}$$

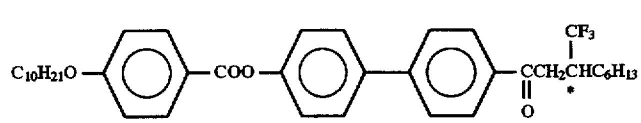

(2)

-continued

Cryst. $\overset{49° C.}{\rightleftarrows}$ SmC* $\overset{104° C.}{\rightleftarrows}$ SmA $\overset{135° C.}{\rightleftarrows}$ Iso.

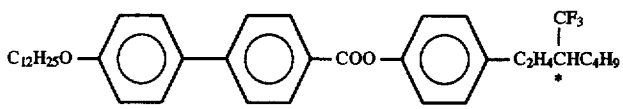
(3)

Cryst. $\overset{-10° C.}{\rightleftarrows}$ SmC* $\overset{46° C.}{\rightleftarrows}$ SmA $\overset{81° C.}{\rightleftarrows}$ Iso.

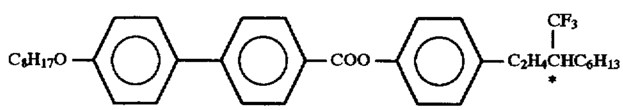
(4)

Cryst. $\overset{17° C.}{\rightleftarrows}$ Sm3 $\overset{39° C.}{\rightleftarrows}$ SmC* $\overset{82° C.}{\rightleftarrows}$ SmA $\overset{132° C.}{\rightleftarrows}$ Iso.

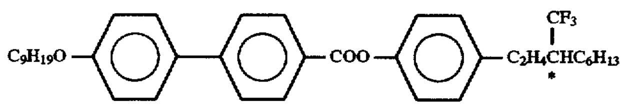
(5)

Cryst. $\overset{-0.8° C.}{\rightleftarrows}$ Sm3 $\overset{46° C.}{\rightleftarrows}$ SmC* $\overset{90° C.}{\rightleftarrows}$ SmA $\overset{123° C.}{\rightleftarrows}$ Iso.

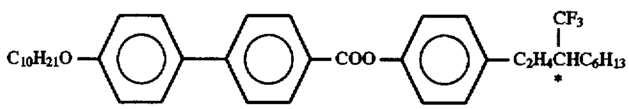
(6)

Cryst. $\overset{14° C.}{\rightleftarrows}$ Sm3 $\overset{36° C.}{\rightleftarrows}$ SmC* $\overset{90° C.}{\rightleftarrows}$ SmA $\overset{121° C.}{\rightleftarrows}$ Iso.

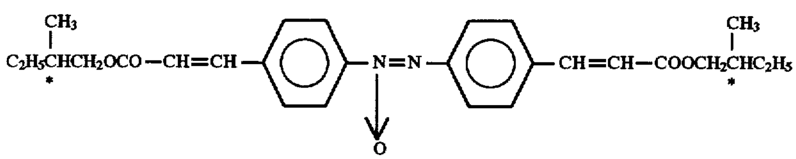
(7)

4,4-azoxycinnamic acid-bis(2-methylbutyl)ester

Cryst. $\overset{121° C.}{\leftrightarrow}$ SmC* $\overset{134° C.}{\leftrightarrow}$ SmA $\overset{168° C.}{\leftrightarrow}$ Iso.

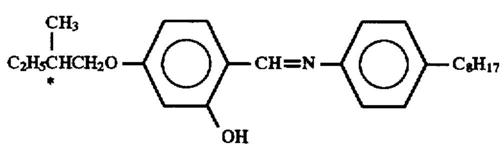
(8)

4-o-(2-methyl)-butylresorcylidene-4'-octylaniline (MBRA 8)

Cryst. $\overset{28° C.}{\rightleftarrows}$ SmC* $\overset{55° C.}{\rightleftarrows}$ SmA $\overset{62° C.}{\rightleftarrows}$ Iso.

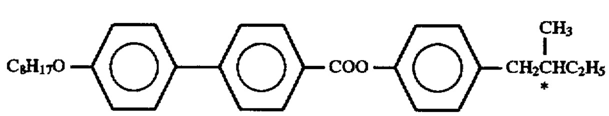
(9)

4-(2'-methylbutyl)phenyl-4'-octyloxybiphenyl-4-carboxylate

Cryst. $\overset{78° C.}{\leftrightarrow}$ Sm3 $\overset{80° C.}{\leftrightarrow}$ SmC* $\overset{128.3° C.}{\leftrightarrow}$ SmA $\overset{171° C.}{\leftrightarrow}$ Ch. $\overset{174.2° C.}{\leftrightarrow}$ Iso.

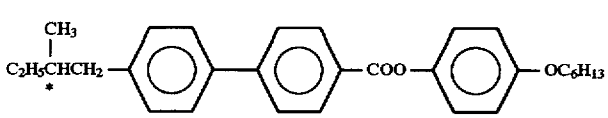
(10)

-continued 4-hexyloxyphenyl-4-(2"-methylbutyl)biphenyl-4'-carboxylate

Cryst. $\xleftrightarrow{68.8^\circ\text{ C.}}$ SmC* $\xleftrightarrow{80.2^\circ\text{ C.}}$ Ch. $\xleftrightarrow{163.5^\circ\text{ C.}}$ Iso.

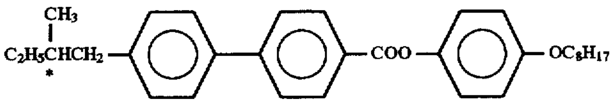
(11)

4-octyloxyphenyl-4-(2"-methylbutyl)biphenyl-4'-carboxylate

Cryst. $\xleftrightarrow{76^\circ\text{ C.}}$ SmC* $\xleftrightarrow{88.6^\circ\text{ C.}}$ Ch. $\xleftrightarrow{155.4^\circ\text{ C.}}$ Iso.

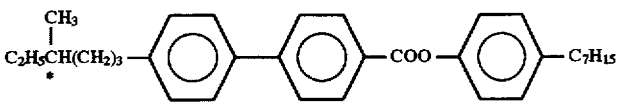
(12)

4-heptylphenyl-4-(4"-methylhexyl)biphenyl-4'-carboxylate

Cryst. $\xleftrightarrow{91.5^\circ\text{ C.}}$ SmC* $\xleftrightarrow{93^\circ\text{ C.}}$ SmA $\xleftrightarrow{112^\circ\text{ C.}}$ Ch. $\xleftrightarrow{131^\circ\text{ C.}}$ Iso.

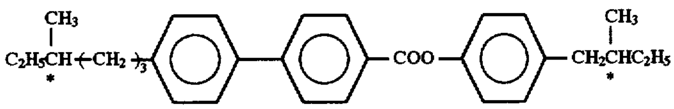
(13)

4-(2"-methylbutyl)phenyl-4-(4"-methylhexyl)-biphenyl-4'-carboxylate

Cryst. $\xrightarrow{83.4^\circ\text{ C.}}$ Ch. $\xrightarrow{114^\circ\text{ C.}}$ Iso.

Ch. $\xrightarrow{81.0^\circ\text{ C.}}$ SmA

SmA $\xrightarrow{74.3^\circ\text{ C.}}$ SmC*

SmC* $\rightarrow$ Cryst.

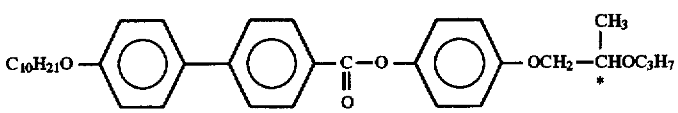
(14)

Cryst. $\xrightarrow{84^\circ\text{ C.}}$ SmC* $\underset{141^\circ\text{ C.}}{\overset{144^\circ\text{ C.}}{\longleftrightarrow}}$ SmA $\underset{159^\circ\text{ C.}}{\overset{162^\circ\text{ C.}}{\longleftrightarrow}}$ Iso.

SmC* $\xrightarrow{72^\circ\text{ C.}}$ SmI

SmI $\xrightarrow{45^\circ\text{ C.}}$ Cryst.

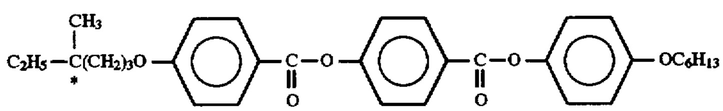
(15)

Cryst. $\underset{72.4^\circ\text{ C.}}{\overset{95.6^\circ\text{ C.}}{\longleftrightarrow}}$ SmC* $\underset{108^\circ\text{ C.}}{\overset{115^\circ\text{ C.}}{\longleftrightarrow}}$ Ch. $\underset{183^\circ\text{ C.}}{\overset{187^\circ\text{ C.}}{\longleftrightarrow}}$ Iso.

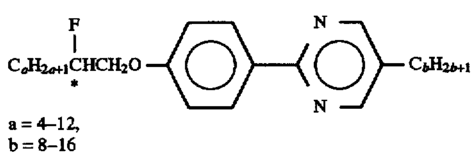
(16)

a = 4–12,
b = 8–16
(Case where a = 6, b = 12)

Cryst. $\xrightarrow{56^\circ\text{ C.}}$ SmC* $\xrightarrow{70^\circ\text{ C.}}$ SmA $\xrightarrow{74^\circ\text{ C.}}$ Iso.

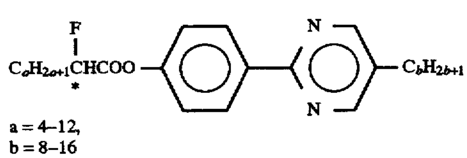
(17)

a = 4–12,
b = 8–16
(Case where a = 8, b = 10)

Cryst. $\xleftarrow{3^\circ\text{ C.}}$ SmC* $\xleftarrow{43^\circ\text{ C.}}$ SmA $\xleftarrow{46^\circ\text{ C.}}$ Ch. $\xleftarrow{48^\circ\text{ C.}}$ Iso.

-continued

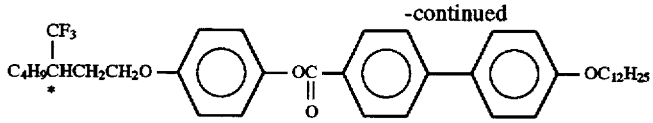

(18)

Cryst. $\xrightarrow{58° C.}$ SmC* $\xrightarrow{120° C.}$ SmA $\xrightarrow{146° C.}$ Iso.

When a liquid crystal composition according to the present invention shows chiral smectic phase, it is possible to include an optically inactive low-Mw mesomorphic compound in the liquid crystal composition, thus enlarging a temperature range of SmC* and improving response speed.

Specific examples of such an optically inactive low-Mw mesomorphic compound used in the present invention may include those represented by the following structural formulae, which are shown below together with phase transition series. The optically inactive low-Mw mesomorphic compound may preferably has smectic C phase (SmC) in view of enlargement of a liquid crystal temperature range.

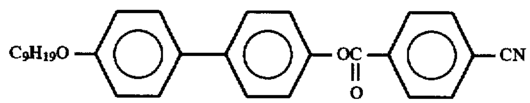

(19)

4'-n-nonyloxy-4-biphenylyl-4-cyanobenzoate

Iso. → N. → SmC

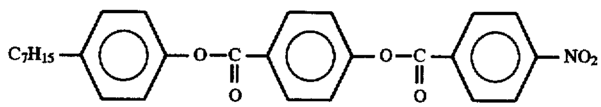

(20)

4-n-heptylphenyl-4-(4'-nitrobenzoyloxy)benzoate ($DB_7NO_2$)

Iso. → N. → SmA

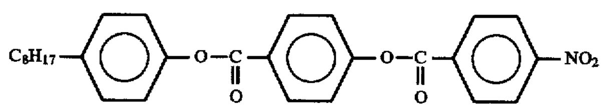

(21)

4-n-octylphenyl-4-(4'-nitrobenzoyloxy)benzoate ($DB_8NO_2$)

Iso. → N. → SmA → SmC

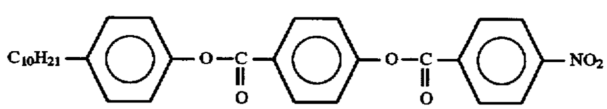

(22)

4-n-decylphenyl-4-(4'-nitrobenzoyloxy)benzoate ($DB_{10}NO_2$)

Iso. → N. → SmA → SmC

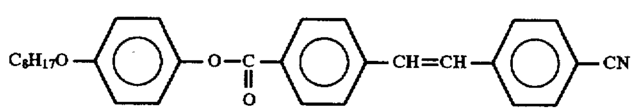

(23)

trans-4-(4"-octyloxybenzoyloxy)-4'-cyanostilbene (T8)

Iso. → $SmA_1$ → N. → $SmA_2$

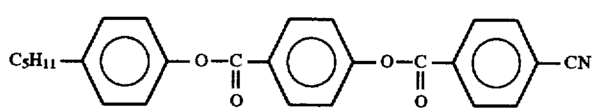

(24)

4-n-pentylphenyl-4-(4'-cyanobenzoyloxy)benzoate ($DB_5CN$)

Iso. → N. → SmA

-continued (25)

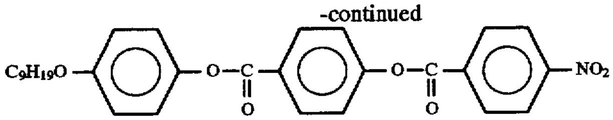

4-n-nonyloxyphenyl-4-(4'-nitrogenzoyloxy)benzoate ($DB_9ONO_2$)

Iso. $\rightarrow$ N. $\rightarrow$ SmA $\rightarrow$ SmC (26)

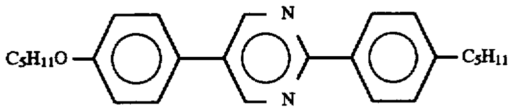

2-(4'-n-pentylphenyl)-5-(4"-n-pentyloxyphenyl)-pyrimidine

Iso. $\rightarrow$ SmA $\rightarrow$ SmC $\rightarrow$ SmF $\rightarrow$ SmG (27)

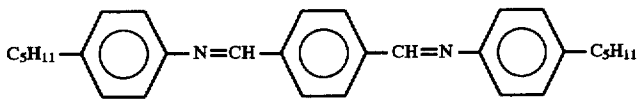

terephthalidene-bis-4-pentylaniline (TBPA)

Iso. $\rightarrow$ N. $\rightarrow$ SmA $\rightarrow$ SmC $\rightarrow$ SmF $\rightarrow$ SmG $\rightarrow$ SmH (28)

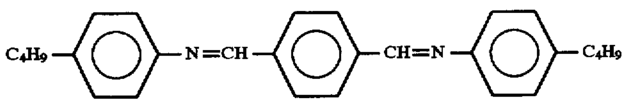

terephthalidene-bis-4-butylaniline (TBBA)

Iso. $\rightarrow$ N. $\rightarrow$ SmA $\rightarrow$ SmC $\rightarrow$ SmG $\rightarrow$ SmH (29)

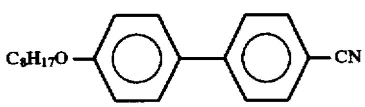

4-cyano-4'-n-octyloxybiphenyl (8OCB)

Iso. $\rightarrow$ N. $\rightarrow$ SmA (30)

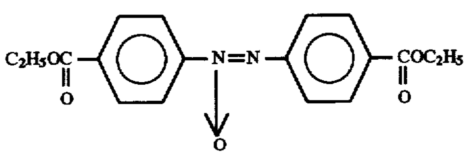

diethyl p,p'-azoxydibenzoate

Iso. $\rightarrow$ SmA (31)

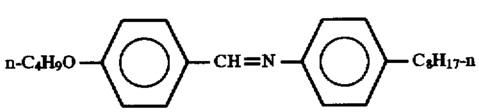

N-(4'-n-butyloxybenzylidene)-4-n-octylaniline (408)

Iso. $\rightarrow$ SmA $\rightarrow$ SmB (32)

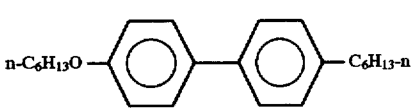

4-n-hexyl-4'-n-hexyloxybiphenyl

Iso. $\rightarrow$ SmB $\rightarrow$ SmE

-continued

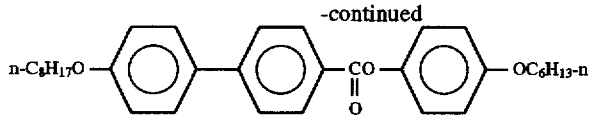

(33)

4-n-hexyloxyphenyl-4'-n-octyloxybiphenyl-4-carboxylate

Iso. → N. → SmA → SmC → SmB

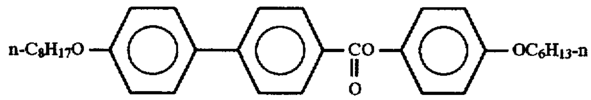

(34)

4-n-hexyloxyphenyl-4'-n-octyloxybiphenyl-4-carboxylate

Iso. → N. → SmA → SmC → SmB

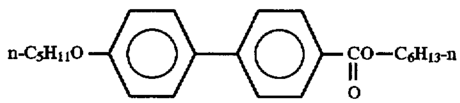

(35)

n-hexyl-4'-n-pentyloxybiphenyl-4-carboxylate (65OBC)

Iso. → SmA → SmB → SmE

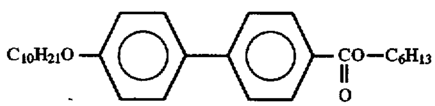

(36)

4-n-hexyl-4'-n-decyloxybiphenyl-4-carboxylate

Iso. → SmA → SmC

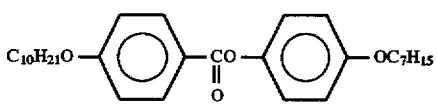

(37)

4-n-heptyloxyphenyl-4-n-decyloxybenzoate

Iso. → SmA → SmC

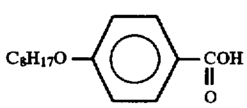

(38)

4-n-octyloxybenzoic acid

Iso. → N. → SmC

The liquid crystal composition according to the present invention may optionally include a low-Mw compound as generally used together with a known polymer (or polymeric) liquid crystal. Examples of such a low-Mw compound may include: aliphatic compounds having a long or short chain, siloxane compounds and biphenyl compounds. The liquid crystal composition may further include a known polymer or a known polymer liquid crystal unless advantages of the liquid crystal composition are impaired.

The mesomorphic compound of the formula (I) may preferably be contained in a proportion of 5 wt. % or more, further preferably 10 wt. % or more, most preferably 15–95 wt. %, in the liquid crystal composition according to the present invention. Below 5 wt. %, there can result in insufficient formability, strength and film forming characteristic.

Further, the mesomorphic compound or the liquid crystal composition according to the present invention (hereinbelow, sometimes referred to as "liquid crystal material") may be used together with an additive, such as a colorant, a photo-stabilizer, a plasticizer, and a photo-absorber added thereto.

In the present invention, a liquid crystal material can widely be used by utilizing various mesomorphic (or liquid crystal) phases such as nematic phase, cholesteric phase, smectic phase and chiral smectic phase. If the liquid crystal material has nematic phase, the material can be applied to TN type liquid crystal etc. If the material has cholesteric phase, it can be applied to a thin film showing a selective reflection wavelength. Further, if the material has chiral smectic phase, it can be applied to a ferroelectric liquid crystal having bistability for use in a liquid crystal device showing good responsiveness. The above-mentioned materials are effective in readily providing a large area liquid crystal device. Particularly, in case where the material shows ferroelectricity, a resultant liquid crystal device shows good performances including a response time of milli-seconds or below being impossible of achievement by nematic liquid crystals.

A liquid crystal device according to the present invention comprises a pair of electrode plates and a layer of the above-mentioned mesomorphic compound of the formula (I) or the liquid crystal composition disposed between the electrode plates. Each of the electrode plates comprises a substrate and an electrode disposed on the substrate.

The layer of the mesomorphic compound or the liquid crystal composition may be formed as by coating or application on a substrate of an arbitrary material, such as glass, plastic or metal. The substrate may be provided with a transparent electrode or a patterned electrode of ITO film etc.

In the present invention, a method of aligning the mesomorphic compound or the liquid crystal composition may include: a method of forming an alignment control layer on the electrode plates; a method of exerting shearing on the mesomorphic compound or the liquid crystal composition in a liquid crystal state to effect realignment; a method of performing stretching including uniaxial stretching, biaxial stretching, co-stretching, inflation, etc.; and a method of applying a magnetic field or an electric field. These alignment methods may be used singly or in combination thereof.

The liquid crystal layer may be subjected to an appropriate aligning treatment, examples of which may include the following.

A. Homogeneous alignment (molecular axes of liquid crystal molecules are aligned in parallel with a substrate surface)

(1) Rubbing method:

A substrate is coated with an alignment control film by forming a film of e.g. an inorganic insulating substance, such as silicon monoxide, silicon dioxide, aluminum oxide, zirconia, magnesium fluoride, cerium oxide, cerium fluoride, silicon nitride, silicon carbide or boron nitride; or an organic insulating substance, such as polyvinyl alcohol, polyimide, polyamideimide, polyesterimide, polyparaxylylene, polyester, polycarbonate, polyvinylacetal, polyvinylchloride, polyamide, polystyrene, cellulosic resin, melamine resin, urea resin or acrylic resin, by application of a solution, vapor deposition or sputtering. The alignment control film formed as a film of an inorganic insulating substance or organic insulating substance as described above may then be rubbed in one direction with velvet, cloth or paper on the surface thereof.

(2) Oblique vapor deposition:

An oxide such as SiO, a fluoride, or a metal such as Au or Al or its oxide, is vapor-deposited on a substrate in a direction forming an angle inclined with respect to the substrate.

(3) Oblique etching:

An organic or inorganic insulating film as described in (1) above formed on a substrate is etched by radiation with an ion beam or oxygen plasma incident in an oblique direction.

(4) Use of a stretched polymer film:

A film of obtained by stretching a film of a polymer such as polyester or polyvinyl alcohol also shows a good orientation characteristic.

(5) Grating:

Grooves are formed on a substrate surface by photolithography, stamping or injection. In this instance, liquid crystal molecules are aligned with the direction of the grooves.

(6) Shearing:

The mesomorphic compound or the liquid crystal composition is aligned by applying a shearing force thereto at or above a temperature giving a liquid crystal state.

(7) The mesomorphic compound or the liquid crystal composition is aligned by uniaxial or biaxial stretching. It is also possible to apply co-stretching with a substrate of a plastic, such as polyester or polyvinyl alcohol.

B. Homogeneous alignment (molecular axes of liquid crystal molecules are aligned perpendicularly to a substrate surface)

(1) Formation of a homeotropic alignment film:

A substrate surface is coated with a layer of an organic silane, lecithin or PTFE (polytetrafluoroethylene) having a homeotropic orientation characteristic.

(2) Oblique vapor deposition:

Oblique vapor deposition is performed on a substrate while the substrate is rotated and the vapor deposition angle is appropriately selected to provide a homeotropic orientation characteristic. Further, it is also possible to apply a homeotropic aligning agent as shown in (1) above after the oblique vapor deposition.

A switching device, for example, may be obtained by applying a counter substrate having an electrode onto the liquid crystal layer which has been subjected to an aligning treatment as described above. Alternatively, the mesomorphic compound or the liquid crystal composition in a molten state can be injected into a cell structure having electrodes or both sides through an injection port to form a liquid crystal device.

The thus obtained liquid crystal device may be used as a display device or a memory device. A liquid crystal device incorporating a mesomorphic compound or liquid crystal composition showing a ferroelectric chiral smectic phase affords high-speed switching and can be used as a large area display device or memory device with a good memory characteristic because of bistability. In order to realize such bistability, the liquid crystal layer may be set thin, e.g., 10 microns or less.

Figure 2:
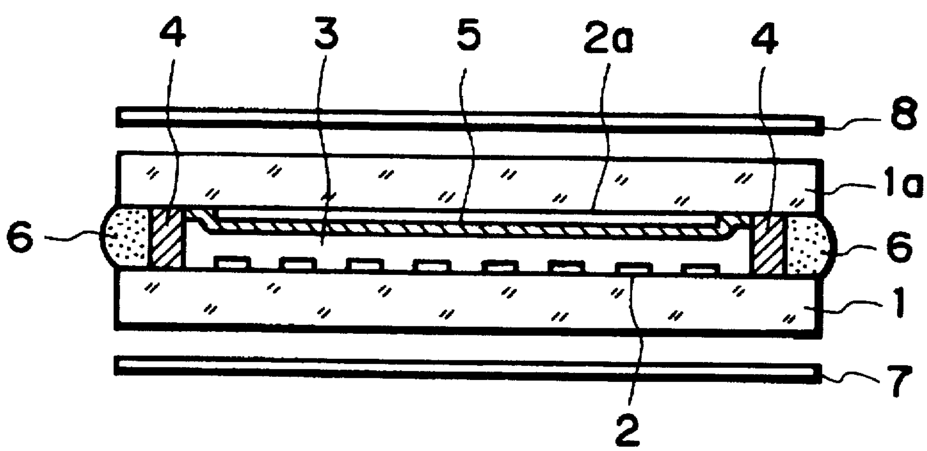
FIG. 2 is schematic A–A' line-sectional view of the device shown in FIG. 1.

FIGS. 1 and 2 show a structural embodiment of the liquid crystal device of the present invention, wherein FIG. 1 is a schematic plan view of the device and FIG. 2 is a schematic A–A' line-sectional view of the device.

Referring to FIGS. 1 and 2, the liquid crystal device of the present invention includes a pair of substrates 1 and 1*a* (at least one of which can have birefringence or be used in combination with a polarizer) comprising a glass plate or a plastic plate and held to have a prescribed (but arbitrary) gap with a spacer 4. The periphery of the substrates 1 and 1*a* is sealed up with an adhesive 6 such as an epoxy resin. On the substrate 1*a*, plural transparent electrodes 2*a* (e.g., electrodes for applying scanning voltage) with a prescribed pattern, e.g., in the form of stripes, are formed. On the other hand, plural transparent electrodes 2 (e.g., electrodes for applying signal voltage) perpendicular to the electrodes 2*a* (i.e., crossing the electrodes 2 at right angles) are formed on the substrate 1.

Referring to FIG. 2, a display layer 3 is disposed between the substrates 1 and 1*a* having the transparent electrodes 2 and 2*a* (i.e., a pair of electrode plates), respectively, thereon. In this embodiment, an alignment control layer 5 can be is formed on the transparent electrode 2*a*.

The alignment control layer 5 formed on the substrate 1*a* with the electrode 2*a* thereon may include: inorganic materials such as silicon monoxide, silicon dioxide, aluminum oxide, zirconia, magnesium fluoride, cerium oxide, cerium fluoride, silicon nitride, silicon carbide, and boron nitride; and organic materials such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin, acrylic resin, and epoxy resin. The alignment control layer 5 may be formed by rubbing a film of the inorganic or organic material described above with velvet, cloth or paper in one direction so as to provide a uniaxial alignment characteristic. Further, it is possible to compose the alignment control layer of two layers, e.g., by first forming a layer of the inorganic material and forming thereon a layer of an organic material. In a preferred embodiment, it is possible to form an alignment control layer on a substrate by oblique vapor deposition with the inorganic material such as SiO or $SiO_2$. It is also possible to impart an alignment-controlling effect to a substrate such as one comprising glass or plastic by effecting oblique etching after providing an inorganic or organic insulating material on the substrate. The use of the alignment control layer is effective for uniformly aligning liquid crystal molecules in one direction.

The alignment control layer 5 may preferably be used also as an insulating layer. Accordingly, the thickness of the alignment control layer may generally have 100 Å-1 micron, preferably 500–5000 Å. The insulating layer also has the advantage of preventing current conduction due to a trace impurity in the liquid crystal layer 3, whereby the display layer little deteriorate even in a repetitive operation. In the present invention, the alignment control layers may also be formed on the substrate 1 having thereon the electrodes 2.

In FIG. 2, a polarizer 7 and an analyzer 8 are disposed outside of the substrates 1 and 1*a*, respectively.

Hereinbelow, the present invention will be explained with reference to Examples, but it is to be understood that the present invention is not restricted to these Examples.

EXAMPLE 1

(+)-1,1,3,3,5,5-hexamethyl-1,5-di-4'-[4"-(1-trifluoromethylheptyloxymethyl)-phenyloxycarbonyl] biphenyloxyundecanyltrisiloxane shown below was synthesized through the steps (i) to (v) below.

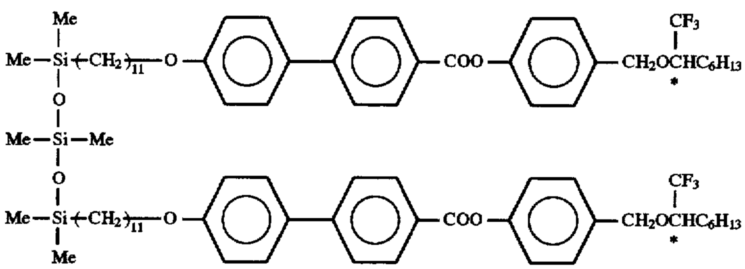

(Me: methyl)

(i) Production of 10-undecenyl p-toluenesulfonate 4.32 g (54.0 mM) of dry pyridine was added to 3.40 g (20.0 mM) of 10-undecene-1-ol, followed by stirring for 10 minutes at 0° C. To the mixture, 3.80 g (20.0 mM) of p-toluenesulfonyl chloride was added, followed by stirring for 4 hours at room temperature. After the reaction, the reaction mixture was acidified with 2M-hydrochloric acid (HCl) and extracted with ether to obtain an extract. The extract was dried with anhydrous sodium sulfate, followed by distilling-off of ether to obtain 6.20 g (19.1 mM) of 10-undecenyl p-toluenesulfonate (Yield: 95.5%).

(ii) Production of ethyl p-(10-undecenyl) oxybiphenylcarboxylate

The above-prepared 6.20 g (19.1 mM) of 10-undecenyl p-toluenesulfonate, 4.62 g (19.1 mM) of ethyl p-hydroxybiphenylcarboxylate and 6 ml of dimethylformamide (DMF) were mixed and sufficiently stirred. To the mixture, 0.77 g (19.3 mM) of 60% -sodium hydride was added, followed by heat-refluxing for 7 hours. After the reaction, the reaction mixture was subjected to distilling-off of DMF and addition of water, followed by extraction with ether to obtain an extract. The extract was dried with anhydrous sodium sulfate, followed by distilling-off of ether and purification by column chromatography (eluent: methylene chloride) to obtain 6.46 g (16.4 mM) of ethyl p-(10-undecenyl)oxybiphenylcarboxylate (Yield: 86%).

(iii) Production of p-(10-undecenyl)oxybiphenylcarboxylic acid

A solution of 6.46 g (16.4 mM) of ethyl p-(10-undecenyl) oxybiphenylcarboxylic acid and 2.18 g (54.6 mM) of sodium hydroxide in 4 ml of water was mixed with 30 ml of methanol, followed by 3 hours of refluxing at 50° C. After the reaction, 20 ml of distilled water was added to the reaction mixture, followed by distilling-off of methanol and acidification with 6M-HCl to obtain a crude product. The crude product was filtered and dried in a desiccator under reduced pressure to obtain 5.56 g (15.2 mM) of p-(10-undecenyl)oxybiphenylcarboxylic acid (Yield: 92.8%).

(iv) Production of (−)-p-(10-undecenyl) oxybiphenylcarboxylic acid-p'-(1-trifluoromethylheptyloxymethyl)phenyl ester below:

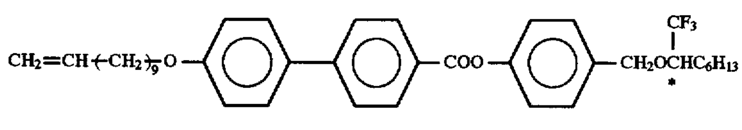

1.43 g (3.9 mM) of p-(10-undecenyl) oxybiphenylcarboxylic acid was mixed with 8 ml of thionyl chloride, followed by heat-refluxing for 3 hours. After the heat-refluxing, unreacted thionyl chloride was distilled off to obtain an acid chloride.

Then, to a solution of 0.87 g (7.80 mM) of triethylenediamine in 5 ml of dry benzene, 1.16 mg (4.0 mM) of (+)-p-(1-trifluoromethylheptyloxymethyl)phenol ($[\alpha]_D^{27}$=+29.3 degrees (c=0.60, $CH_2Cl_2$)) was added. The mixture was added dropwise to the above-prepared acid chloride under stirring, followed by heating for 2 hours at 50° C. To the resultant mixture, 0.19 g (4.70 mM) of 60%-sodium hydride and an appropriate amount of dry benzene were added, followed by heat-refluxing for 2 hours. After the reaction, the reaction mixture was acidified with 2M-HCl and extracted with benzene to obtain an extract. The extract was dried with anhydrous sodium sulfate and subjected to distilling-off of benzene, followed by purification by column chromatography (eluent: benzene) and recrystallization from 4 ml of hexane to obtain 2.0 g (3.15 mM) of (−)-p-(10-undecenyl) oxybiphenylcarboxylic acid-p'-(1-trifluoromethylheptyloxymethyl)phenyl ester (Yield: 82%).

$[\alpha]_D^{27}$=−21.1 degrees (C=0.49, benzene)

(v) Production of (+)-1,1,3,3,5,5-hexamethyl-1,5-di-4'-[4"-(1-trifluoromethylheptyloxymethyl)-phenyloxycarbonyl] biphenyloxyundecanyltrisiloxane.

0.313 g (0.5 mM) of (−)-p-(10-undecenyl) oxybiphenylcarboxylic acid-p'-(1-trifluoromethylheptyloxymethyl) phenyl ester and 0.5 ml of dry toluene were mixed. To the mixture, 3 mg (about 0.002 mM) of 1M-solution of platinic chloride in isopropanol was added and stirred for about 3 minutes, followed by addition of 0.067 g (0.5 mM) of 1,1,3,3,5,5-hexamethyltrisiloxane and further by stirring for 7 hours at 100° C. To the resultant mixture, 0.10 g (0.16 mM) of (−)-p-(10-undecenyl)oxybiphenylcarboxylic acid-p'-(1-trifluoromethyl-heptyloxymethyl)phenyl ester was further added, followed by stirring for 4 hours at 100° C.

After the reaction, the reaction mixture was purified by column chromatography (eluent: methylene chloride/hexane=1/1) and recrystallized from 5 ml of hexane to obtain 0.298 g (0.21 mM) of (+)-1,1,3,3,5,5-hexamethyl-1,5-di-4'-[4"-(1-trifluoromethylheptyloxymethyl)-phenyloxycarbonyl]biphenyloxyundecanyltrisiloxane (Yield: 64%).

$[\alpha]_D^{28}$=+17.6 degrees (c=0.63, $CH_2Cl_2$)

Phase transition temperature $$\text{Cryst.} \xrightarrow{54°\,C.} \text{SmC*} \xrightarrow{114°\,C.} \text{SmA} \xrightarrow{118°\,C.} \text{Iso.}$$

EXAMPLE 2

A liquid crystal device was prepared by injecting (+)-1,1,3,3,5,5-hexamethyl-1,5-di-4'-[4"-(1-trifluoromethylheptyloxymethyl)-phenyloxycarbonyl] biphenyloxyundecanyltrisiloxane prepared in Example 1 in a PI (polyimide)-rubbed cell having a pair of electrode plates (electrode: ITO) with a cell gap (i.e., a thickness of a liquid crystal layer) of 5 μm.

The thus prepared liquid crystal device was subjected to measurement of response time at 90° C. under an applied voltage of 4V/μm, whereby the following result was obtained.

Response time: 173 μsec.

EXAMPLE 3

A liquid crystal composition was prepared by mixing 1 wt. part of (+)-1,1,3,3,5,5-hexamethyl-1,5-di-4'-[4"-(1-trifluoromethylheptyloxymethyl)-phenyloxycarbonyl] biphenyloxyundecanyltrisiloxane prepared in Example 1 with 9 wt. parts of (+)-4-decyloxybenzoic acid-4'-(2"-fluorooctyloxy)phenyl ester (SmC*=75°– 83° C.).

The thus prepared liquid crystal composition showed a temperature range of SmC* of 62°–91° C.

EXAMPLE 4

(+)-1,1,3,3,5,5-hexamethyl-1,5-di-4'-[4"-(1-trifluoromethylheptyloxymethyl)-phenylcarbonyloxy] biphenyloxyundecanyltrisiloxane shown below was synthesized through the steps (i) to (iii) below.

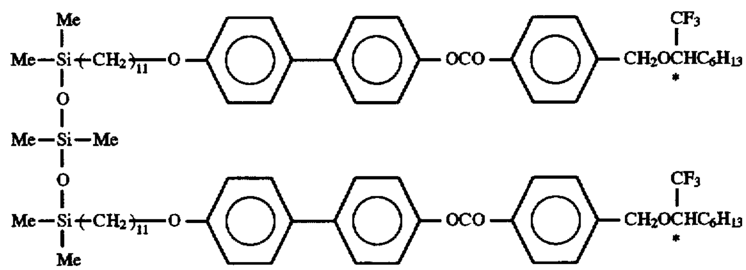

(i) Production of p-(10-undecenyl) oxyhydroxybiphenyl

The above-prepared 2.60 g (8.02 mM) of 10-undecenyl p-toluenesulfonate, 3.0 g (16.0 mM) of dihydroxybiphenyl and 3 ml of butanol were mixed and sufficiently stirred. To the mixture, a solution of 0.41 g (9.74 mM) of sodium hydride in 6 ml of butanol was added, followed by heat-refluxing for 7 hours at 110° C. After the reaction, the reaction mixture was subjected to distilling-off of butanol and addition of water, followed by extraction with ether to obtain an extract. The extract was dried with anhydrous sodium sulfate, followed by distilling-off of ether and purification by column chromatography (eluent: methylene chloride) to obtain 1.55 g (3.82 mM) of p-(10-undecenyl) oxyhydroxybiphenyl (Yield: 47.6%).

(ii) Production of (−)-p-(1-trifluoromethylheptyloxymethyl) benzoic acid-p'-(10-undecenyloxy)biphenyl ester 0.64 g (2.1 mM) of (+)-p-(1-trifluoromethylheptyloxymethyl)benzoic acid was mixed with 3 ml of thionyl chloride, followed by heat-refluxing for 1.5 hours. After the heat-refluxing, unreacted thionyl chloride was distilled off to obtain an acid chloride.

Then, to a solution of 0.45 g (4.0 mM) of triethylenediamine in 3 ml of dry benzene, 0.81 mg (2.0 mM) of p-(10-undecenyloxy)hydroxybiphenyl was added. The mixture was added dropwise to the above-prepared acid chloride under stirring, followed by heating for 2 hours at 50° C. To the resultant mixture, 0.08 g (2.0 mM) of 60%-sodium hydride and an appropriate amount of dry benzene were added, followed by heat-refluxing for 2 hours. After the reaction, the reaction mixture was acidified with 2M-HCl and extracted with benzene to obtain an extract. The extract was dried with anhydrous sodium sulfate and subjected to distilling-off of benzene, followed by purification by column chromatography (eluent: benzene) and recrystallization from 2 ml of hexane to obtain 1.1 g (1.72 mM) of (−)-p-(1-trifluoromethylheptyloxymethyl)benzoic acid-p'-(10-undecenyloxy)biphenyl ester (Yield: 86%).

$[\alpha]_D^{28}$=+−22.9 degrees (C=0.511, $CHCl_3$)

Phase transition temperature $$\text{Cryst.} \underset{23^\circ\text{ C.}}{\overset{41^\circ\text{ C.}}{\rightleftarrows}} \text{SmX} \underset{56^\circ\text{ C.}}{\overset{57^\circ\text{ C.}}{\rightleftarrows}} \text{SmC*} \underset{96^\circ\text{ C.}}{\overset{96^\circ\text{ C.}}{\rightleftarrows}} \text{SmA} \underset{98^\circ\text{ C.}}{\overset{99^\circ\text{ C.}}{\rightleftarrows}} \text{Ch.} \underset{100^\circ\text{ C.}}{\overset{100^\circ\text{ C.}}{\rightleftarrows}} \text{Iso.}$$

(iii) Production of (+)-1,1,3,3,5,5-hexamethyl-1,5-di-4'-[4"-(1-trifluoromethylheptyloxymethyl)-phenylcarbonyloxy]biphenyloxyundecanyltrisiloxane 0.32 g (0.5 mM) of (−)-p-(1-trifluoromethylheptyloxymethyl)benzoic acid-p'-(10-undecenyloxy)biphenyl ester and 0.5 ml of dry toluene were mixed. To the mixture, 3 mg (about 0.002 mM) of 1M-solution of platinic chloride in isopropanol was added and stirred for about 3 minutes, followed by addition of 0.067 g (0.5 mM) of 1,1,3,3,5,5-hexamethyltrisiloxane and further by stirring for 7 hours at 100° C. To the resultant mixture, 0.11 g (0.15 mM) of (−)-p-(1-trifluoromethylheptyloxymethyl)benzoic acid-p'-(10-undecenyloxy)biphenyl ester was further added, followed by stirring for 4 hours at 100° C.

After the reaction, the reaction mixture was purified by column chromatography (eluent: methylene chloride/hexane=1/1) and recrystallized from 3 ml of hexane to obtain 0.27 g (0.2 mM) of (+)-1,1,3,3,5,5-hexamethyl-1,5-di-4'-[4"-(1-trifluoromethylheptyloxymethyl)-phenylcarbonyloxy]biphenyloxyundecanyltrisiloxane (Yield: 60%).

$[\alpha]_D^{26}$=+17.8 degrees (c=0.544, $CH_2Cl_2$)

EXAMPLE 5

1,1,3,3,5,5-hexamethyl-1,5-di-4'-[4"-(1-trifluoromethyloctyloxycarbonyl)-phenyloxycarbonyl]phenyloxyundecanyltrisiloxane shown below was synthesized through the steps (i) and (ii) below.

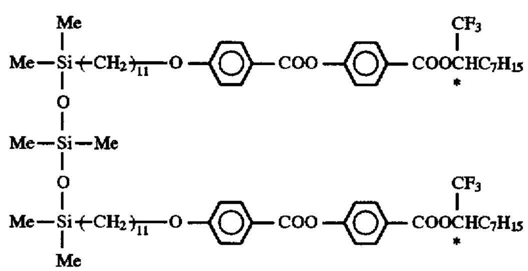

(i) Production of p-(10-undecenyl)oxybenzoic acid-p'-(1-trifluoromethyloctyloxycarbonyl)phenyl ester below

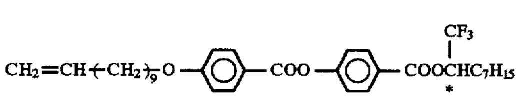

1.44 g (1.5 mM) of p-(10-undecenyl)oxybenzoic acid was mixed with 2 ml of thionyl chloride, followed by heat-refluxing for 2 hours. After the heat-refluxing, unreacted thionyl chloride was distilled off to obtain an acid chloride.

Then, a solution of 0.34 g (3.0 mM) of triethylenediamine in 3 ml of dry benzene was added to 0.44 mg (1.5 mM) of p-(1-trifluoromethyloctyloxycarbonyl)phenol and stirred under cooling with ice. To the mixture, a solution of the above-prepared acid chloride in benzene was added dropwise, followed by stirring for 2 hours at 50° C. To the resultant mixture, 40 mg of 60%-sodium hydride and an appropriate amount of dry benzene were added, followed by heat-refluxing for 2 hours. After the reaction, the reaction mixture was acidified with 2M-HCl and extracted with ether to obtain an extract. The extract was dried with anhydrous sodium sulfate and subjected to distilling-off of the solvent, followed by purification by column chromatography (eluent: benzene) to obtain 0.37 g (0.65 mM) of p-(10-undecenyl)oxybenzoic acid-p'-(1-trifluoromethyloctyloxycarbonyl)phenyl ester (Yield: 43%).

(ii) Production of 1,1,3,3,5,5-hexamethyl-1,5-di-4'-[4"-(1-trifluoromethyloctyloxycarbonyl)-phenyloxycarbonyl]phenyloxyundecanyltrisiloxane 0.12 g (0.21 mM) of p-(10-undecenyl) oxybenzoic acid-p'-(1-trifluoromethyloctyloxycarbonyl)phenyl ester and 0.2 ml of dry toluene were mixed. To the mixture, 3 mg (about 0.002 mM) of 1M-solution of platinic chloride in isopropanol was added and stirred for about 3 minutes, followed by addition of 0.028 g (0.21 mM) of 1,1,3,3,5,5-hexamethyltrisiloxane and further by stirring for 7 hours at 100° C. To the resultant mixture, 0.024 g (0.036 mM) of p-(10-undecenyl)oxybenzoic acid-p'-(1-trifluoromethyloctyloxycarbonyl)phenyl ester was further added, followed by stirring for 5 hours at 100° C.

After the reaction, the reaction mixture was purified by column chromatography (eluent: methylene chloride/hexane=1/1) to obtain 0.09 g (0.07 mM) of 1,1,3,3,5,5-hexamethyl-1,5-di-4'-[4"-(1-trifluoromethyloctyloxycarbonyl)-phenyloxycarbonyl]phenyloxyundecanyltrisiloxane (Yield: 64%).

EXAMPLE 6

A polymer-type mesomorphic compound B was synthesized through the following steps (i) and (ii).

Step (i)

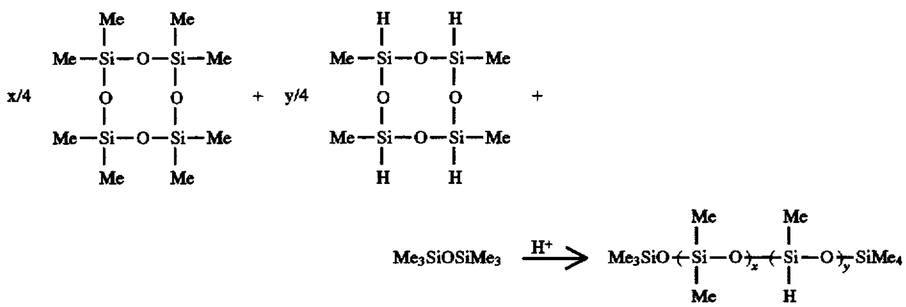

A (x = y = 16)

Step (ii)

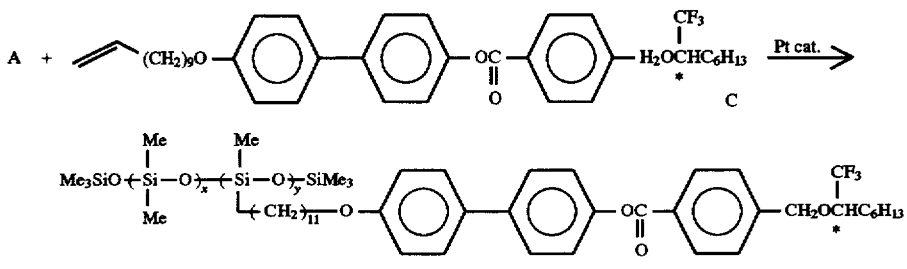

B (1) Production of Compound A 1.186 g (4 mM) of 1,1,3,3,5,5,7,7-octamethylcyclotetrasiloxane, 0.962 g (4 mM) of 1,3,5,7-tetramethylcyclotetrasiloxane and 0.160 g (1 mM) of 1,1,1,3,3,3-hexamethyldisiloxane were placed in a round-bottomed flask in a nitrogen atmosphere and stirred. To the mixture, one drop of trifluoromethansulfonic acid as a catalyst was added dropwise, followed by stirring for 20 hours at room temperature. After the reaction, 10 ml of ether was added to the reaction mixture, followed by three times of washing with 1%-sodium hydrogencarbonate aqueous solution to obtain an ether layer. The ether layer was dried overnight with an anhydrous sodium sulfate, followed by distilling-off of the solvent and further distilling-off of the low-Mw component under reduce pressure with a vacuum pump to obtain 1.979 g of Compound A (Yield: 85.7%).

(ii) Production of Compound B 28.9 mg of the Compound A and 141 mg (0.22 mM) of a separately prepared liquid crystal C ($[\alpha]_D^{25}$=+22.9 degrees (c=0.511, $CHCl_3$)) were placed in a round-bottomed flask in a nitrogen atmosphere. To the mixture, 3 ml of platinic chloride as a catalyst in toluene was added, followed by stirring for 40 hours at 100° C. After the reaction, the solvent was distilled off from the reaction mixture, followed by addition of 5 ml of benzene and 100 mg of activated carbon and further stirring for 3 hours at room temperature. The resultant mixture was filtered with Celite (trade name). The filtrate was subjected to distilling-off of the solvent to obtain a crude product. The crude product was dissolved in 0.75 ml of tetrahydrofuran (THF) and re-precipitated two times in 20 ml of methanol, respectively, followed by drying in a dissicator to obtain 104 mg of Compound B (Yield: 66%).

Mn=$1.8\times10^4$–$1.9\times10^4$ (as measured by GPC, polystyrene (PST) converted value)

$[\alpha]_D^{25}$=+16.2 degrees (c=0.526, $CHCl_3$)
$[\alpha]_{435}^{25}$=+39.2 degrees (c=0.526, $CHCl_3$)

Phase transition temperature $$\text{Cryst.} \underset{60^\circ\text{ C.}}{\overset{60^\circ\text{ C.}}{\rightleftharpoons}} \text{SmC*} \underset{134^\circ\text{ C.}}{\overset{133^\circ\text{ C.}}{\rightleftharpoons}} \text{SmA} \underset{140^\circ\text{ C.}}{\overset{140^\circ\text{ C.}}{\rightleftharpoons}} \text{Iso.}$$

EXAMPLE 7

A liquid crystal device was prepared by applying the Compound B prepared in Example 6 onto a glass plate provided with an ITO electrode and further applying the glass plate to another glass plate provided with an ITO electrode. The thus prepared liquid crystal device had a cell gap of 1.5 μm and was subjected to shearing to align or oritent the mesomorphic compound (Compound B).

The thus treated liquid crystal device was subjected to measurement of spontaneous polarization (Ps), response time (τ) and tilt angle (θ) under application of a voltage of 4V/μm. The results are shown below.

| Tc-T*1 (°C.) | Ps (nC/cm²) | τ (ms) | θ (degrees) |
|---|---|---|---|
| 10 | −102 | 0.8 | 34 |
| 20 | −141 | 1.26 | 40 |
| 30 | −158 | 2.14 | 41 |
| 40 | −179 | 4.06 | 42 |
| 50 | −204 | 7.62 | 44 |

*1"Tc-T" means a difference between a phase transition temperature Tc (°C.) from SmA to SmC* and a measuring temperature T (°C.)

EXAMPLE 8

A polymer-type mesomorphic compound D was synthesized through the following reaction scheme.

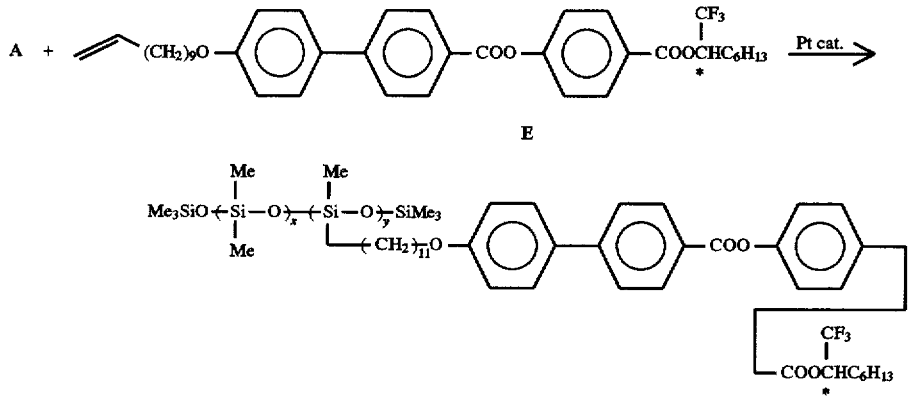

E

D 28.9 mg of the Compound A and 143 mg (0.22 mM) of a separately prepared liquid crystal E ($[\alpha]_D^{25}$=+29.1 degrees (c=0.531, $CHCl_3$)) were placed in a round-bottomed flask in a nitrogen atmosphere. To the mixture, 3 ml of platinic chloride as a catalyst in toluene was added, followed by stirring for 40 hours at 100° C. After the reaction, the solvent was distilled off from the reaction mixture, followed by addition of 5 ml of benzene and 100 mg of activated carbon and further stirring for 3 hours at room temperature. The resultant mixture was filtered with Celite (trade name). The filtrate was subjected to distilling-off of the solvent to obtain a crude product. The crude product was dissolved in 0.75 ml of tetrahydrofuran (THF) and re-precipitated two times in 20 ml of methanol, respectively, followed by drying in a dissicator to obtain 119 mg of Compound B (Yield: 75%).

Mn=2.0×10$^4$ (as measured by GPC, polystyrene (PST) converted value)

$[\alpha]_D^{25}$=+24.5 degrees (c=0.485, $CHCl_3$)
$[\alpha]_{435}^{25}$=+65.5 degrees (c=0.485, $CHCl_3$)
Phase transition temperature $$\text{Cryst.} \underset{\text{R.T. °C.}}{\overset{\text{R.T. °C.}}{\rightleftarrows}} \text{SmC*} \underset{80°\text{ C.}}{\overset{80°\text{ C.}}{\rightleftarrows}} \text{SmA} \underset{144°\text{ C.}}{\overset{144°\text{ C.}}{\rightleftarrows}} \text{Iso.}$$

EXAMPLE 9

A liquid crystal device was prepared by applying the Compound D prepared in Example 8 onto a glass plate provided with an ITO electrode and further applying the glass plate to another glass plate provided with an ITO electrode. The thus prepared liquid crystal device had a cell gap of 1.5 μm and was subjected to shearing to align or oritent the mesomorphic compound (Compound D).

When a voltage of 30 V/μm was applied to the above-treated liquid crystal device, a switching phenomenon due to polarization inversion was observed at 70° C. The liquid crystal device showed a spontaneous polarization (Ps) at 70° C. of 102 nC/cm$^2$ obtained from a polarization inversion current.

EXAMPLE 10

A liquid crystal composition was prepared by mixing 9 wt. parts of the compound prepared in Example 4 having the following formula:

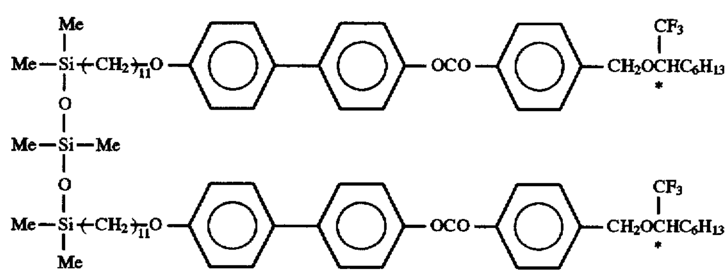

with 1 wt. parts of the Compound B prepared in Example 6.

The thus prepared liquid crystal composition showed a temperature range of SmC* of 56°–101° C.

The liquid crystal composition was injected in a PI (polyimide)-rubbed cell having a pair of electrode plates (electrode: ITO) with a cell gap of 2 μm to prepare a liquid crystal device.

The liquid crystal device was subjected to measurement of response time at 90° C. under application of a voltage of 4 V/μm, whereby a response time of 385 μsec was obtained.

When 10 g of a hard rubber ball was dropped on the surface (display area) of the liquid crystal device from a height of 10 cm, an alignment state of the liquid crystal composition was not disordered and impaired.

EXAMPLE 11

A liquid crystal composition was prepared by mixing 9 wt. parts of the compound prepared in the step (ii) of Example 4 having the following formula:

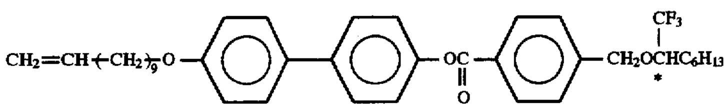

with 1 wt. parts of the Compound D prepared in Example 8.

The thus prepared liquid crystal composition showed a temperature range of SmC* of 46°–90° C.

The liquid crystal composition was injected in a PI (polyimide)-rubbed cell having a pair of electrode plates (electrode: ITO) with a cell gap of 2 μm to prepare a liquid crystal device.

The liquid crystal device was subjected to measurement of response time at 85° C. under application of a voltage of 4 V/μm, whereby a response time of 420 μsec was obtained.

When 10 g of a hard rubber ball was dropped on the surface (display area) of the liquid crystal device from a height of 10 cm, an alignment state of the liquid crystal composition was not disordered and impaired.

As described hereinabove, according to the present invention, there are provided a mesomorphic compound of the formula (I) and a liquid crystal composition comprising at least one species of the mesomorphic compound showing a wider temperature range of SmC* and high speed responsiveness. By using a mesomorphic compound containing: siloxane group giving a low viscosity and optically active group having trifluoromethyl group giving high speed responsiveness, there is provided a liquid crystal device showing a high-speed switching characteristic and excellent impact resistance and also affording a larger display area.

Further, according to the present invention, there is provided a liquid crystal composition comprising the above-mentioned mesomorphic compound and at least one species of another component such as an optically active or inactive low-Mw mesomorphic compound, a low-Mw compound, a polymer, or a polymer liquid crystal. Such a liquid crystal composition is excellent in controlling various properties such as a mesomorphic temperature range, spontaneous polarization and a direction of helical twist. The liquid crystal composition is also suitable for providing a large area liquid crystal device.

What is claimed is:

1. A mesomorphic compound represented by the following formula (I):

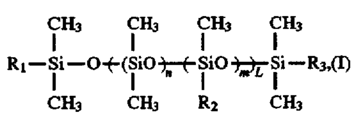

wherein $R_1$ and $R_3$ denote methyl and $R_2$ denotes a mesomorphic residual group represented by the following formula (II):

$$B{-}(Y)_P{-}A{-}(X)_Q{-}C{-} \quad \text{(II)},$$

wherein A is a mesogen group comprising at least two cyclic groups; B is a terminal flexible group; C is a spacer flexible group; and X and Y each is independently selected from the group consisting of —OCO—, —COO—, $—CH_2O—$, $—OCH_2—$ and —O—; and P and Q are independently 0 or 1, the terminal flexible group having an optically active group of the formula:

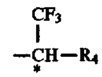

wherein $R_4$ is an alkyl group having 1–12 carbon atoms; n is an integer of 1–5; m is an integer of 1–10; and L is an integer of 1–100; and said mesomorphic compound has a number-average molecular weight of 500–1,000,000.

2. A mesomorphic compound represented by the following formula (I):

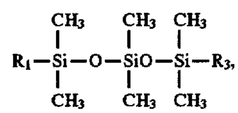 (I)

wherein $R_1$ and $R_3$ denote methyl or a mesomorphic residual group represented by the following formula (II):

$$B{-}(Y)_P{-}A{-}(X)_Q{-}C{-} \quad \text{(II)},$$

wherein A is a mesogen group comprising at least two cyclic groups; B is a terminal flexible group; C is a spacer flexible group; and X and Y each is independently selected from the group consisting of —OCO—, —COO—, $—CH_2O—$, $—OCH_2—$ and —O—; and P and Q are independently 0 or 1, at least one of $R_1$ and $R_3$ being the mesomorphic residual group containing the terminal flexible group B having an optically active group of the formula:

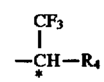

wherein $R_4$ is an alkyl group having 1–12 carbon atoms.

3. A mesomorphic compound according to claims 1 or 2, wherein said mesogen group comprises at least one group selected from the group consisting of:

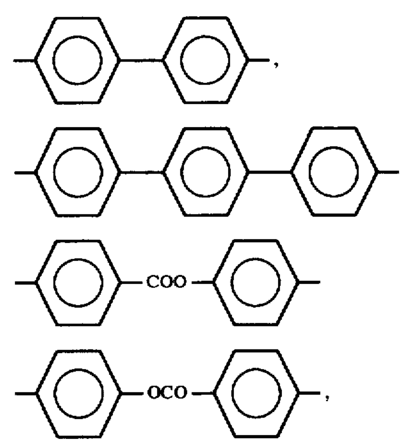

-continued

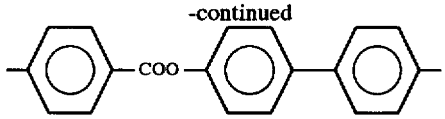

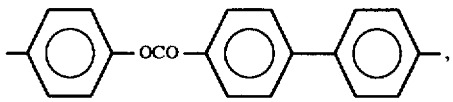

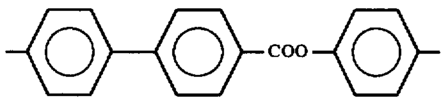

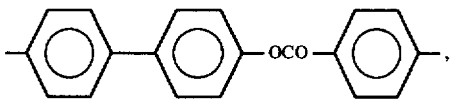

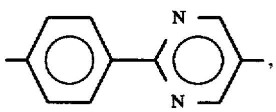

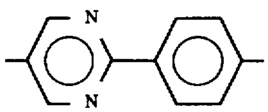

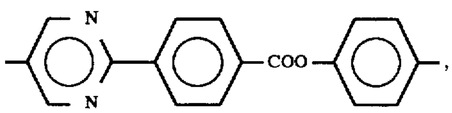

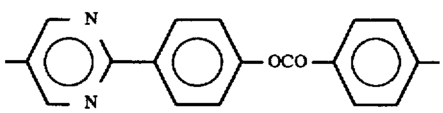

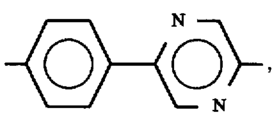

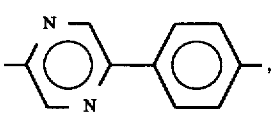

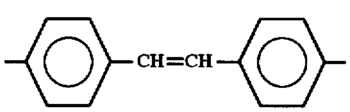

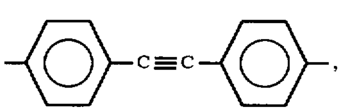

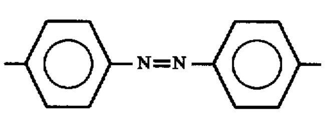

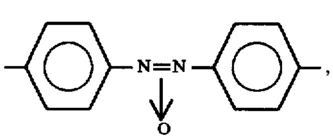

-continued

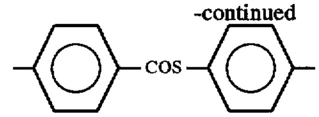

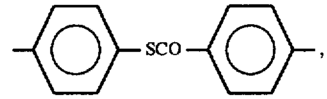

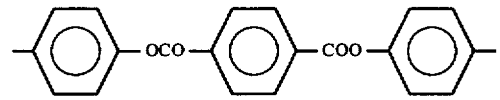

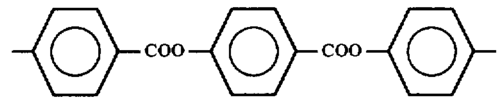

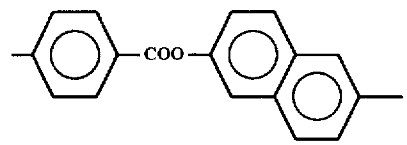

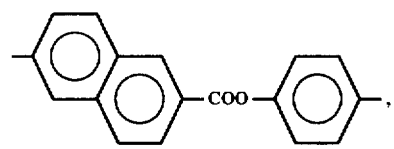

and

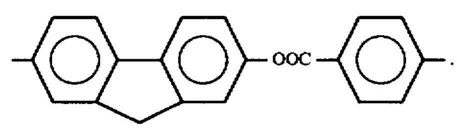

4. A mesomorphic compound according to claims 1 or 2, wherein said spacer flexible group comprises at least one group selected from the group consisting of:

$-(CH_2)_h-$, wherein h is an integer of 2–16;

$-(CH_2CH_2O)_h-CH_2CH_2-$, wherein h is an integer of 1–10;

$-(CH_2CH_2CH_2O)_h-(CH_2)_3-$, wherein h is an integer of 1–10; and $-(CH_2CH_2CH_2CH_2O)_h-(CH_2)_4-$, wherein h is an integer of 1–8.

5. A liquid crystal composition, comprising: at least one species of a mesomorphic compound represented by the following formula (I):

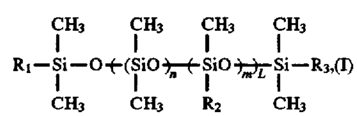

wherein $R_1$ and $R_3$ denote methyl and $R_2$ denotes a mesomorphic residual group represented by the following formula (II):

$$B-(Y)_P-A-(X)_Q-C- \qquad (II),$$

wherein A is a mesogen group comprising at least two cyclic groups; B is a terminal flexible group; C is a spacer flexible group; X is selected from the group consisting of —OCO—, —COO—, $-CH_2O-$, $-OCH_2-$ and —O—; Y is selected from the group consisting of —OCO—, —COO—, $-CH_2O-$, $-OCH_2-$ and —O—; and P and Q are independently 0 or 1, the terminal flexible group B having an optically active group of the formula:

$$-\overset{*}{C}H(CF_3)-R_4$$

wherein $R_4$ is an alkyl group having 1–12 carbon atoms; n is an integer of 1–5; m is an integer of 1–10; and L is an integer of 1–100; and said mesomorphic compound has a number-average molecular weight of 500–1,000,000.

6. A liquid crystal composition, comprising: at least one species of a mesomorphic compound represented by the following formula (I):

$$R_1-Si(CH_3)_2-O-Si(CH_3)_2O-Si(CH_3)_2-R_3, \quad (I)$$

wherein $R_1$ and $R_3$ independently denote methyl or a mesomorphic residual group represented by the following formula (II):

$$B-Y-_P-A-X-_QC- \quad (II),$$

wherein A is a mesogen group comprising at least two cyclic groups; B is a terminal flexible group; C is a spacer flexible group; and X and Y each is independently a bonding group selected from the group consisting of —OCO—, —COO—, —$CH_2$O—, —O$CH_2$— and —O—; and P and Q are independently 0 or 1, at least one of $R_1$ and $R_3$ being the terminal flexible group B having an optically active group of the formula:

$$-\overset{*}{C}H(CF_3)-R_4$$

wherein $R_4$ is an alkyl group having 1–12 carbon atoms.

7. A liquid crystal composition according to claims 5 or 6, wherein said mesogen group comprises at least one group selected from the group consisting of:

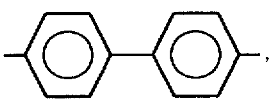

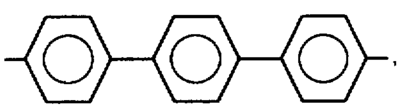

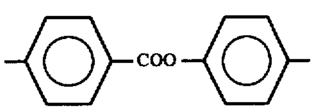

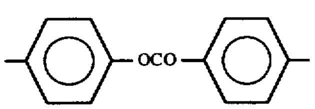

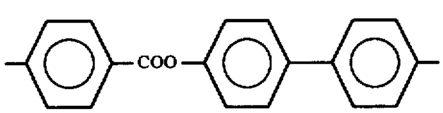

-continued

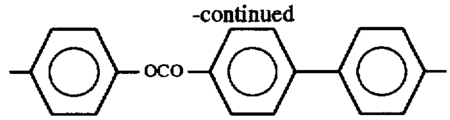

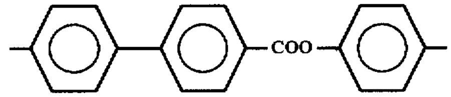

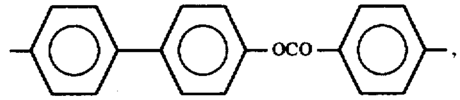

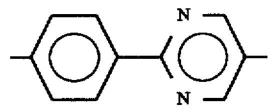

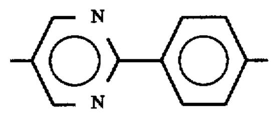

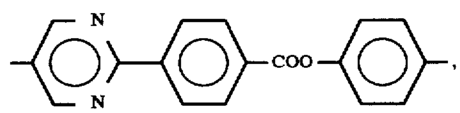

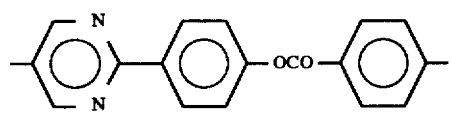

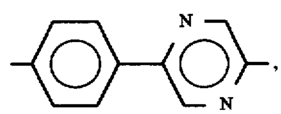

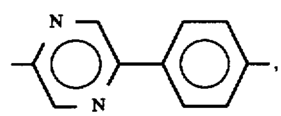

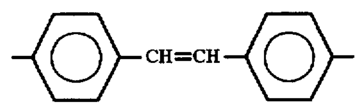

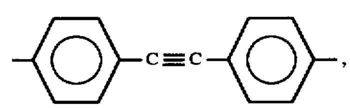

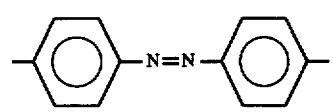

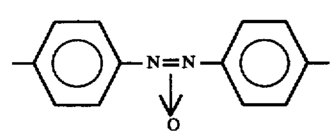

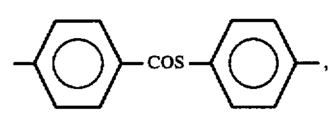

-continued

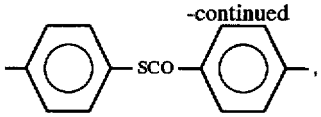

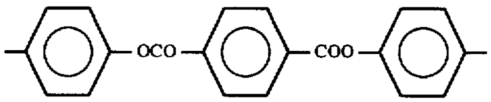

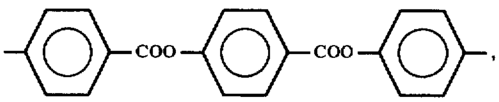

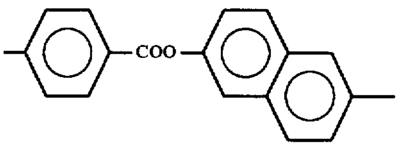

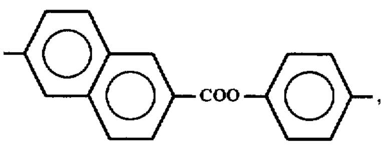

and

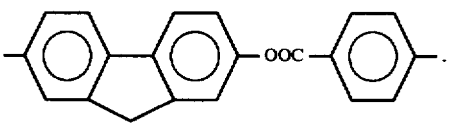

8. A liquid crystal composition according to claims 5 or 6, wherein said spacer flexible group comprises at least one group selected from the group consisting of:

$-(CH_2)_h-$, wherein h is an integer of 2–16;

$-(CH_2CH_2O)_h-CH_2CH_2-$, wherein h is an integer of 1–10;

$-(CH_2CH_2CH_2O)_h-(CH_2)_3-$, wherein h is an integer of 1–10; and $-(CH_2CH_2CH_2CH_2O)_h-(CH_2)_4-$, wherein h is an integer of 1–8.

9. A liquid crystal device, comprising: a pair of electrode plates and a mesomorphic compound according to claims 1 or 2 disposed between the electrode plates.

10. A liquid crystal device, comprising: a pair of electrode plates and a liquid crystal composition according to claims 5 or 6 disposed between the electrode plates.

11. A mesomorphic compound according to claim 3, wherein said mesogen group has at least one substituent selected from the group consisting of cyano, halogen, methoxy, trifluoromethyl and methyl.

12. A liquid crystal composition according to claim 7, wherein said mesogen group has at least one substituent selected from the group consisting of cyano, halogen, methoxy, trifluoromethyl and methyl.

13. A mesomorphic compound according to claims 1 or 2, which has cholesteric, smectic A and chiral smectic C phases in this order upon temperature decrease from isotropic phase.

14. A mesomorphic compound according to claims 1 or 2, which has smectic A and chiral smectic C phases in this order upon temperature decrease from isotropic phase.

15. A liquid crystal composition according to claims 5 or 6, wherein said mesomorphic compound according to formula (I) has cholesteric, smectic A and chiral smectic C phases in this order upon temperature decrease from isotropic phase.

16. A liquid crystal composition according to claims 5 or 6, wherein said mesomorphic compound according to formula (I) has smectic A and chiral smectic C phases in this order upon temperature decrease from isotropic phase.

17. A mesomorphic compound according to claim 1, which has a number-average molecular weight of 600–500,000.

18. A liquid crystal composition according to claim 5, wherein said mesomorphic compound has a number-average molecular weight of 600–500,000.

* * * * *

UNITED STATES PATENT AND TRADEMARK OFFICE
CERTIFICATE OF CORRECTION

PATENT NO. : 5,690,858

DATED : November 25, 1997

INVENTOR(S) : HIROYUKI NOHIRA, ET AL.

It is certified that error appears in the above-identified patent and that said Letters Patent is hereby corrected as shown below:

COLUMN 1

Line 16, "devices" should read --device--; and
Line 40, "histability" should read --bistability--.

COLUMN 2

Line 18, "compatibility" should read --compatibility with--; and

Line 35, " $-\overset{\displaystyle CH_3}{\underset{\displaystyle CH_3}{\overset{|}{\underset{|}{Si}}}}-R_3,\ (I)$ "

should read -- $-\overset{\displaystyle CH_3}{\underset{\displaystyle CH_3}{\overset{|}{\underset{|}{Si}}}}-R_3 \qquad (I),$ --.

COLUMN 6

Line 51, "mesomorphic monomer" should read --Mesomorphic Monomer--.

COLUMN 10

Line 63, "formulae;" should read --formulae,--.

UNITED STATES PATENT AND TRADEMARK OFFICE
CERTIFICATE OF CORRECTION

PATENT NO. : 5,690,858

DATED : November 25, 1997

INVENTOR(S) : HIROYUKI NOHIRA, ET AL.

It is certified that error appears in the above-identified patent and that said Letters Patent is hereby corrected as shown below:

COLUMN 17

Line 5, "______ Nematic" should read --Nematic--.

COLUMN 19

Line 2, " $-CH_2)_8\overset{O}{\overset{\|}{C}}-$ " should read -- $-(CH_2)_8\overset{O}{\overset{\|}{C}}-$ --;

Line 3, " 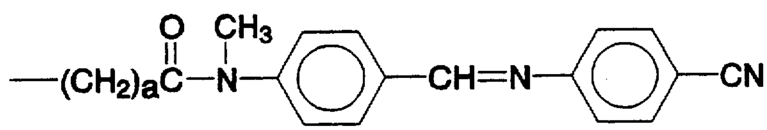 "

should be deleted;

Line 4, "______ Cholesteric" should read --Cholesteric--; and

Line 9, "______ Chiral smectic" should read --Chiral smectic--.

COLUMN 28

Line 53, in (1), " $SmA \underset{}{\overset{132°C}{\rightleftarrows}} Iso.$ "

should read -- $SmA \underset{}{\overset{145°C}{\rightleftarrows}} Iso.$ --.

UNITED STATES PATENT AND TRADEMARK OFFICE

CERTIFICATE OF CORRECTION

PATENT NO. : 5,690,858

DATED : November 25, 1997

INVENTOR(S) : HIROYUKI NOHIRA, ET AL.

It is certified that error appears in the above-identified patent and that said Letters Patent is hereby corrected as shown below:

COLUMN 39

Line 48, "of" (first occurrence) should be deleted.

COLUMN 41

Line 11, "deteriorate" should read --deteriorates--.

COLUMN 44

Line 66, "$[\alpha]_D^{28}$=+-22.9 degrees (C=0.511, $CHCl_3$)" should read --$[\alpha]_D^{26}$ = -22.9 degrees (C=0.511, $CHCl_3$)--.

COLUMN 47

Step (i), "—$SiMe_4$" should read -- —$SiMe_3$ --; and Line 46, "reduce" should read --reduced--.

COLUMN 48

Line 47, "oritent" should read --orient--.

COLUMN 49

Line 66, "oritent" should read --orient--.

COLUMN 51

Line 50, " 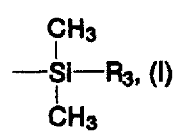 "

should read -- 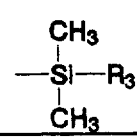 (I), --.

UNITED STATES PATENT AND TRADEMARK OFFICE
CERTIFICATE OF CORRECTION

PATENT NO. : 5,690,858

DATED : November 25, 1997

INVENTOR(S) : HIROYUKI NOHIRA, ET AL.

It is certified that error appears in the above-identified patent and that said Letters Patent is hereby corrected as shown below:

COLUMN 54

Line 52, " 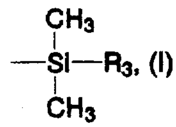 "

should read -- 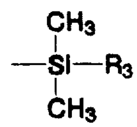 (I), --.

COLUMN 55

Line 25, " $B—Y—{}_{P}—A—X—{}_{Q}C—$ (II), "

should read -- $B—(Y)_{P}—A—(X)_{Q}—C—$ (II), --.

Signed and Sealed this

Twenty-seventh Day of April, 1999

Attest:

Q. TODD DICKINSON

Attesting Officer

*Acting Commissioner of Patents and Trademarks*